(12) United States Patent
Takano et al.

(10) Patent No.: US 8,982,102 B2
(45) Date of Patent: Mar. 17, 2015

(54) COORDINATE INPUT APPARATUS

(71) Applicant: Canon Kabushiki Kaisha, Tokyo (JP)

(72) Inventors: Hirokuni Takano, Yoshikawa (JP); Yuichiro Yoshimura, Yokohama (JP); Katsuyuki Kobayashi, Yokohama (JP); Ritsuo Machii, Tokyo (JP); Takuto Kawahara, Tokyo (JP); Takayuki Hashimoto, Yokohama (JP); Naoki Umemura, Abiko (JP); Hajime Sato, Yokohama (JP); Takayuki Komine, Kawasaki (JP); Akihiro Matsushita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 13/775,626

(22) Filed: Feb. 25, 2013

(65) Prior Publication Data
US 2013/0234955 A1    Sep. 12, 2013

(30) Foreign Application Priority Data

Mar. 8, 2012 (JP) .................................. 2012-052215
Aug. 31, 2012 (JP) .................................. 2012-192297

(51) Int. Cl.
*G09G 5/00* (2006.01)
*G06F 3/042* (2006.01)
*G06F 3/041* (2006.01)

(52) U.S. Cl.
CPC ............ *G06F 3/0421* (2013.01); *G06F 3/0418* (2013.01); *G06F 3/0428* (2013.01)
USPC .......................................... 345/175; 345/173

(58) Field of Classification Search
CPC ..... G06F 3/042; G06F 3/0421; G06F 3/0423; G06F 3/0425; G06F 3/0428
USPC .......... 345/173, 175; 178/18.01, 18.03, 18.09
See application file for complete search history.

(56) References Cited

U.S. PATENT DOCUMENTS

| 4,507,557 A | 3/1985 | Tsikos |
| 4,613,964 A | 9/1986 | Ichikawa et al. |

(Continued)

FOREIGN PATENT DOCUMENTS

| JP | 2001-43021 A | 2/2001 |
| JP | 2004-272353 A | 9/2004 |
| JP | 4118664 B2 | 7/2008 |

OTHER PUBLICATIONS

U.S. Appl. No. 13/673,913, filed Nov. 9, 2012. Inventor: Naoki Umemura.

(Continued)

*Primary Examiner* — Regina Liang
(74) *Attorney, Agent, or Firm* — Fitzpatrick, Cella, Harper & Scinto

(57) ABSTRACT

A coordinate input apparatus includes a light projecting unit configured to project light parallelly to an effective coordinate input region, a reflection unit configured to retroreflect the light projected by the light projecting unit, and a light receiving unit configured to receive light from the light projecting unit or the reflection unit. The coordinate input apparatus includes a moving unit configured to move a set of the light projecting unit, light receiving unit, and reflection unit in a direction perpendicular to the effective coordinate input region in order to ensure a light amount with which a pointed position in the effective coordinate input region can be calculated based on variations of a light amount distribution obtained from the light receiving unit.

19 Claims, 29 Drawing Sheets

(56) References Cited

U.S. PATENT DOCUMENTS

| | | |
|---|---|---|
| 4,886,943 A | 12/1989 | Suzuki et al. |
| 4,887,245 A | 12/1989 | Mori et al. |
| 4,910,363 A | 3/1990 | Kobayashi et al. |
| 4,931,965 A | 6/1990 | Kaneko et al. |
| 4,980,518 A | 12/1990 | Kobayashi et al. |
| 5,070,325 A | 12/1991 | Tanaka et al. |
| 5,097,102 A | 3/1992 | Yoshimura et al. |
| 5,097,415 A | 3/1992 | Yoshimura et al. |
| 5,142,106 A | 8/1992 | Yoshimura et al. |
| 5,210,785 A | 5/1993 | Sato et al. |
| 5,231,394 A | 7/1993 | Sato |
| 5,239,138 A | 8/1993 | Kobayashi et al. |
| 5,500,492 A | 3/1996 | Kobayashi et al. |
| 5,517,553 A | 5/1996 | Sato |
| 5,539,678 A | 7/1996 | Tanaka et al. |
| 5,565,893 A | 10/1996 | Sato et al. |
| 5,621,300 A | 4/1997 | Sato et al. |
| 5,714,698 A | 2/1998 | Tokioka et al. |
| 5,724,647 A | 3/1998 | Sato |
| 5,726,686 A | 3/1998 | Taniishi et al. |
| 5,736,979 A | 4/1998 | Kobayashi et al. |
| 5,751,133 A | 5/1998 | Sato et al. |
| 5,805,147 A | 9/1998 | Tokioka et al. |
| 5,818,429 A | 10/1998 | Tanaka et al. |
| 5,831,603 A | 11/1998 | Yoshimura et al. |
| 5,852,466 A | 12/1998 | Komine et al. |
| 5,936,207 A | 8/1999 | Kobayashi et al. |
| 6,415,240 B1 | 7/2002 | Kobayashi et al. |
| 6,636,199 B2 | 10/2003 | Kobayashi |
| 6,862,019 B2 | 3/2005 | Kobayashi et al. |
| 6,965,377 B2 | 11/2005 | Yanagisawa et al. |
| 7,075,524 B2 | 7/2006 | Kobayashi et al. |
| 7,486,281 B2 | 2/2009 | Kobayashi et al. |
| 7,538,894 B2 | 5/2009 | Kobayashi |
| 7,589,715 B2 | 9/2009 | Tanaka et al. |
| 7,965,904 B2 | 6/2011 | Kobayashi |
| 8,107,641 B2 | 1/2012 | Sakata et al. |
| 8,624,835 B2 * | 1/2014 | Akitt .................. 178/18.09 |
| 2005/0133692 A1 | 6/2005 | Watanabe et al. |
| 2008/0211904 A1 | 9/2008 | Kato et al. |
| 2010/0265216 A1 * | 10/2010 | Yen et al. ............. 345/175 |
| 2011/0141486 A1 | 6/2011 | Wada et al. |
| 2011/0148758 A1 | 6/2011 | Hashimoto |
| 2011/0164114 A1 | 7/2011 | Kobayashi et al. |
| 2011/0304535 A1 | 12/2011 | Machii |
| 2012/0002217 A1 | 1/2012 | Kobayashi et al. |
| 2012/0065929 A1 | 3/2012 | Yoshimura |
| 2013/0076624 A1 | 3/2013 | Sato |
| 2013/0135902 A1 | 5/2013 | Umemura |

OTHER PUBLICATIONS

U.S. Appl. No. 13/781,644, filed Feb. 28, 2013. Inventor: Masahiro Suzuki et al.

U.S. Appl. No. 13/828,270, filed Mar. 14, 2013. Inventor: Katsuyuki Kobayashi et al.

* cited by examiner

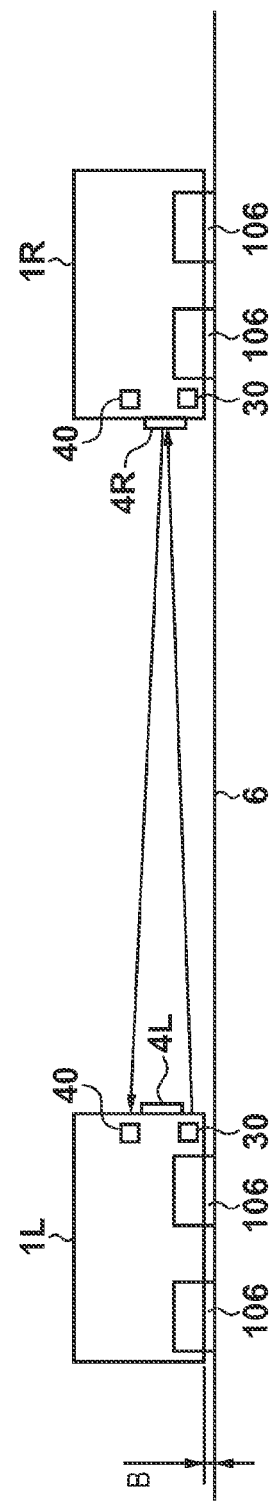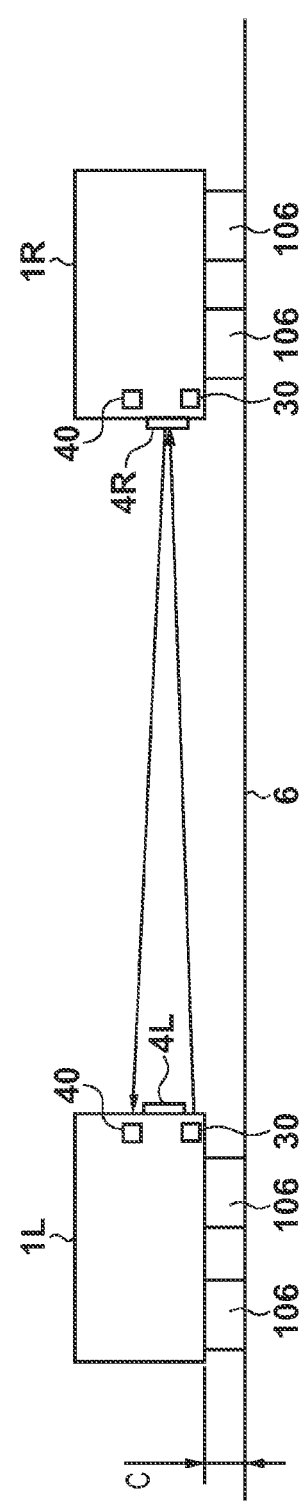

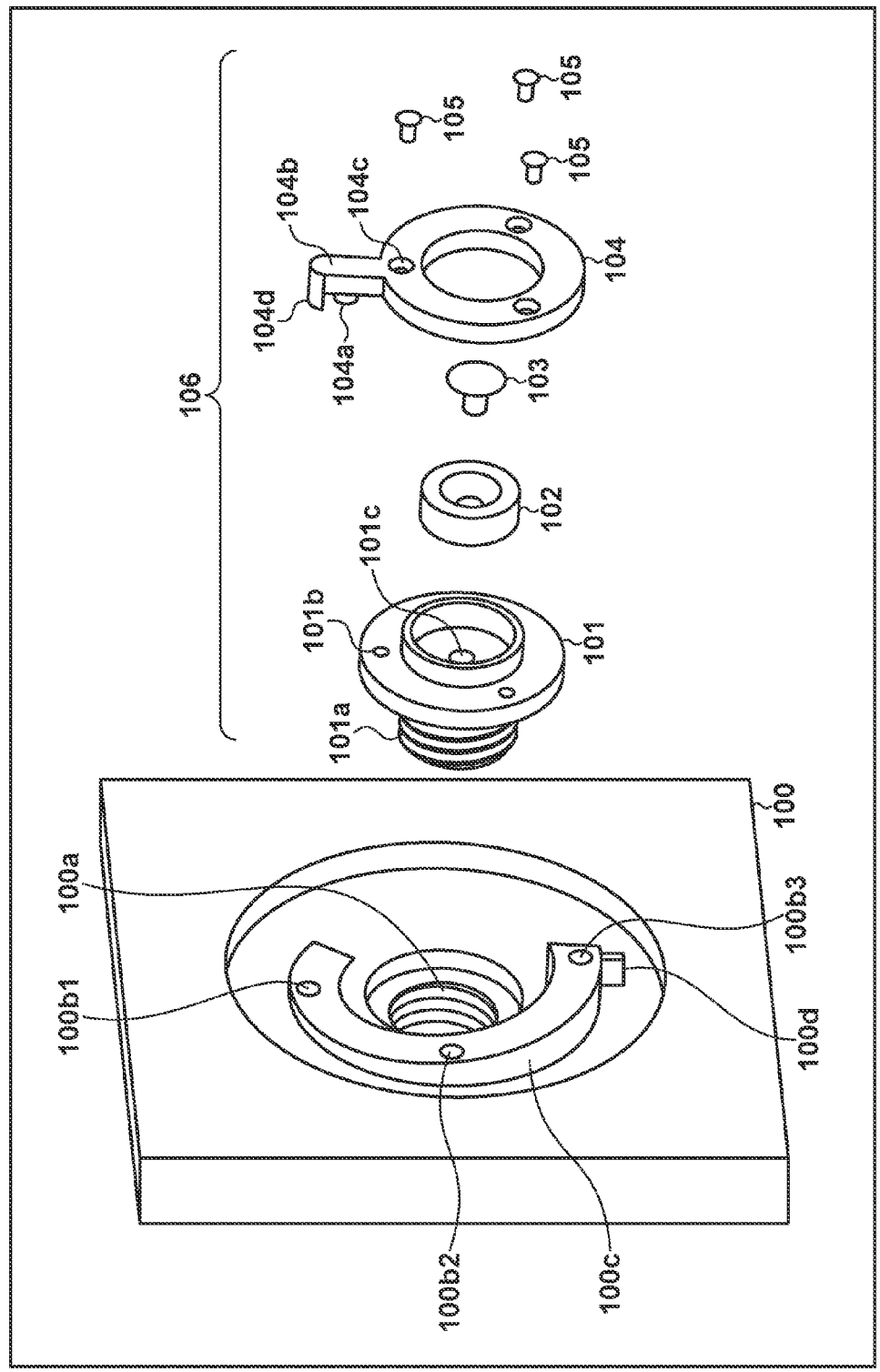

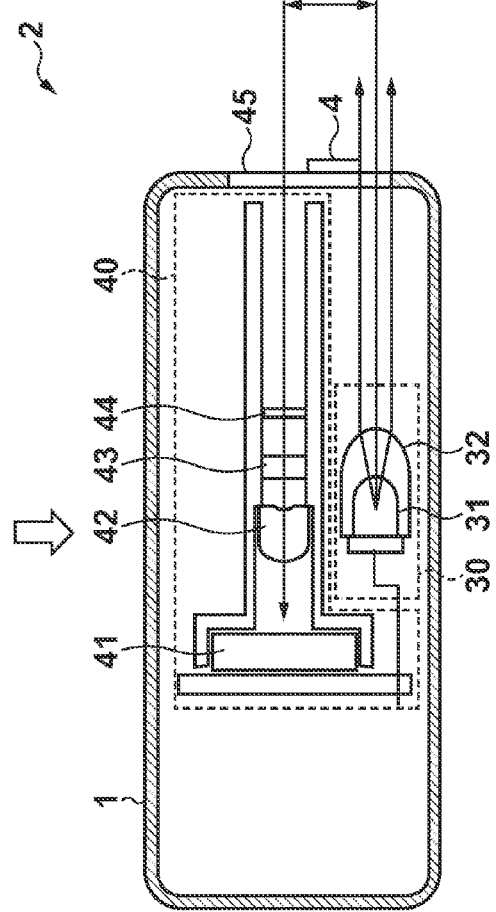
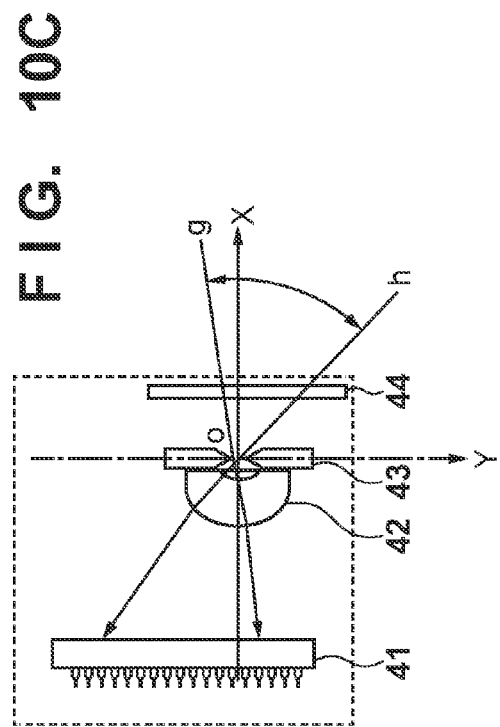
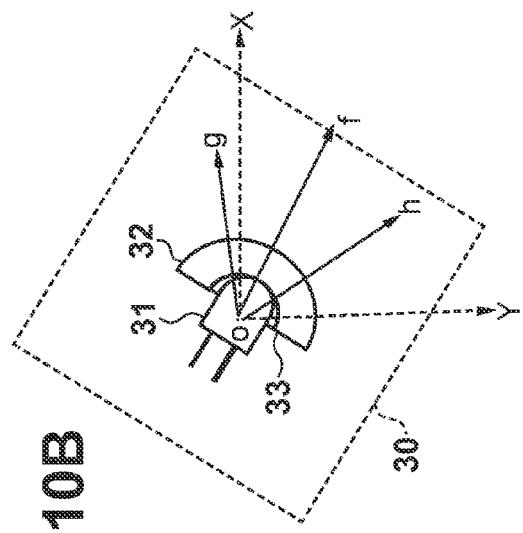
FIG. 10A
FIG. 10C
FIG. 10B

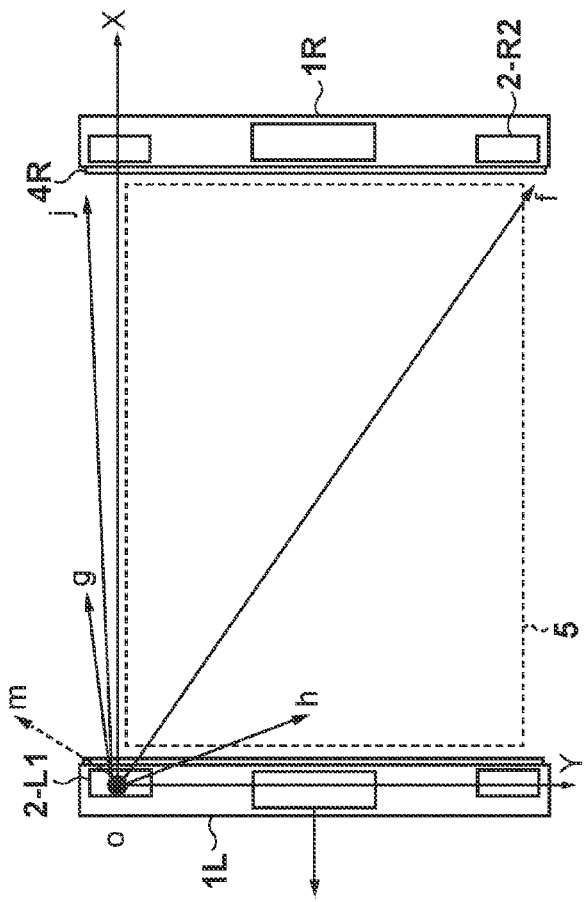
FIG. 11A
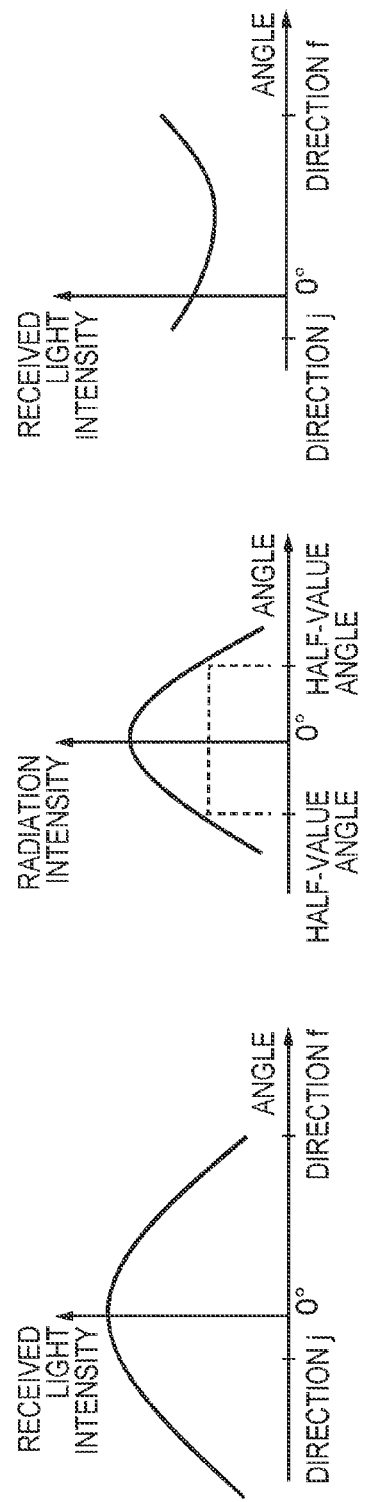
FIG. 11B
FIG. 11C
FIG. 11D

F I G. 15B 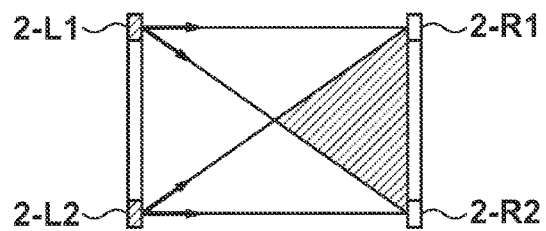
F I G. 15C 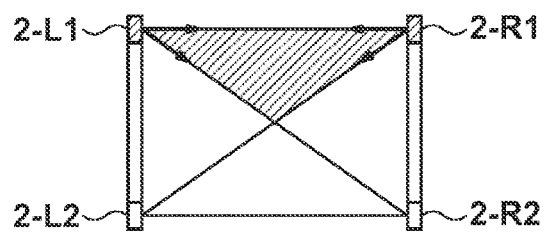
F I G. 15D 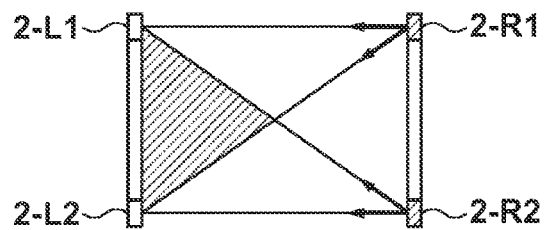
F I G. 15E 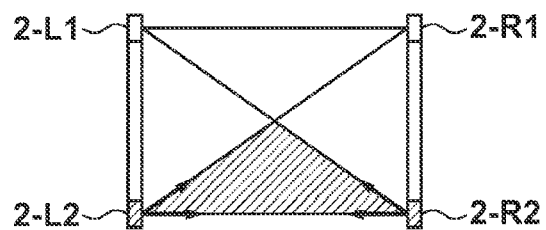
F I G. 15F 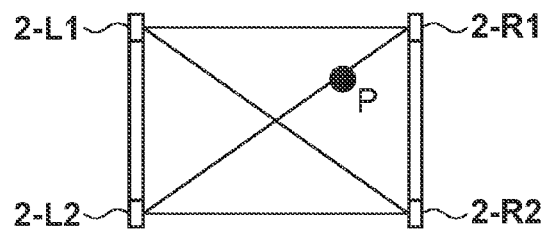

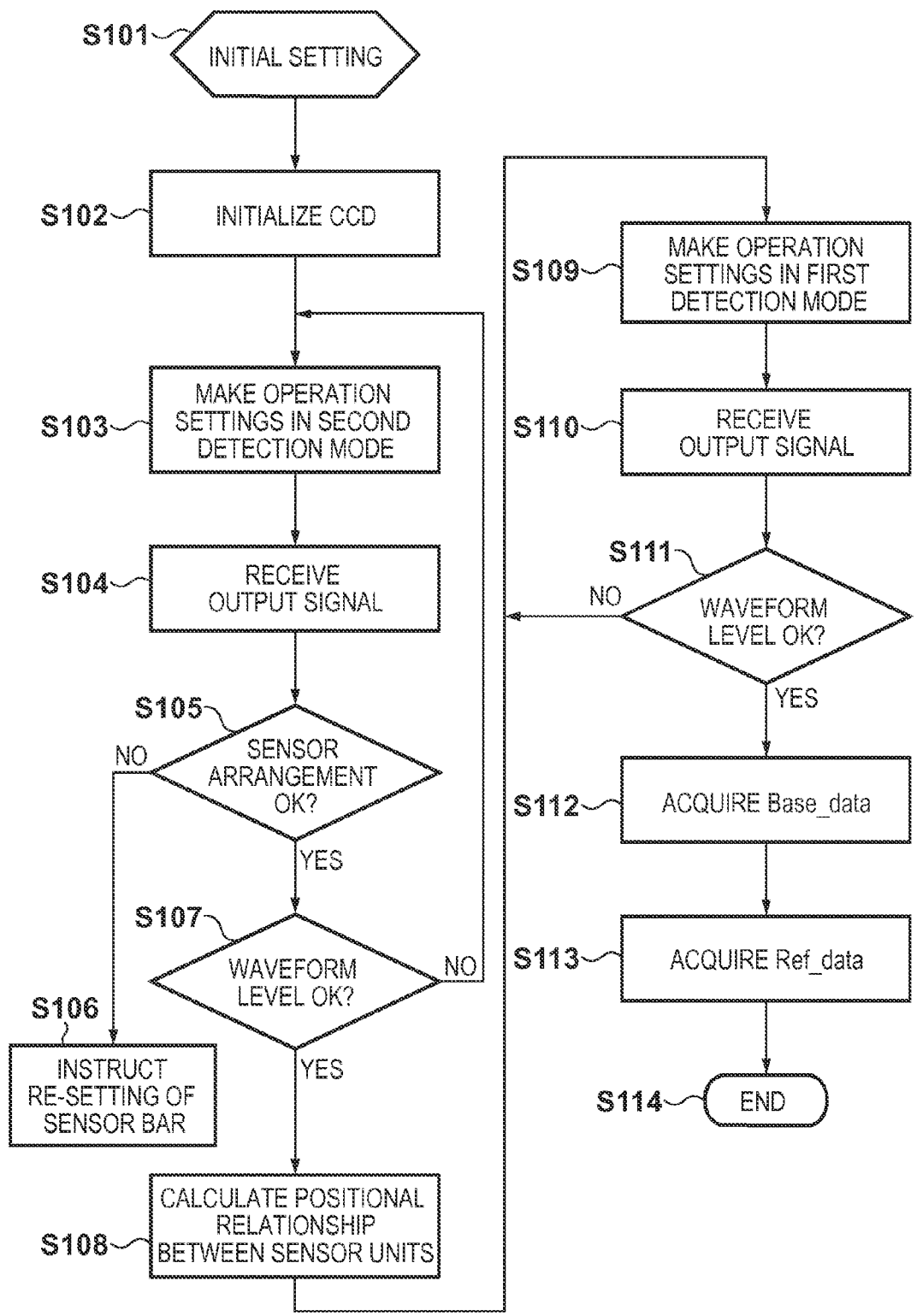
F I G. 19

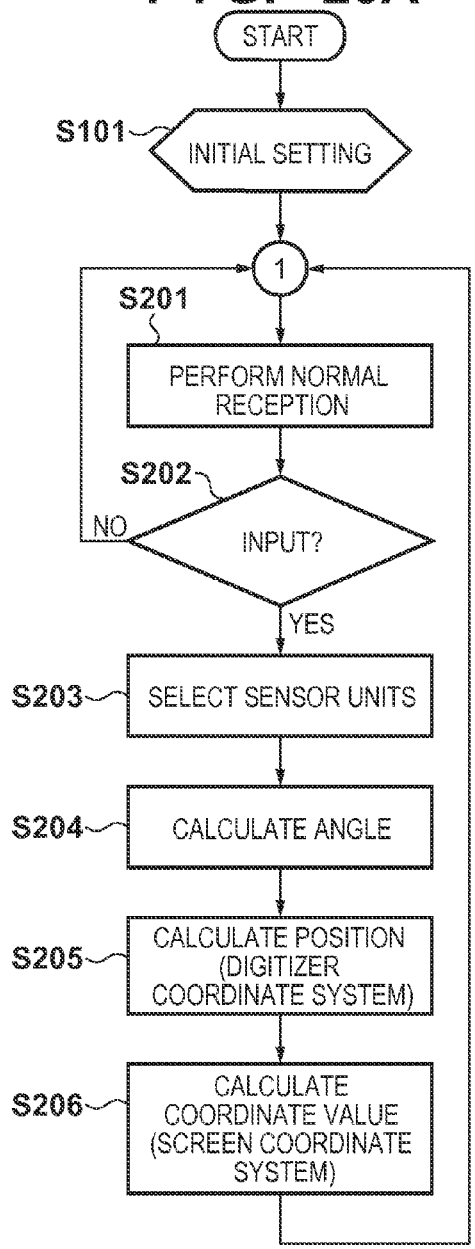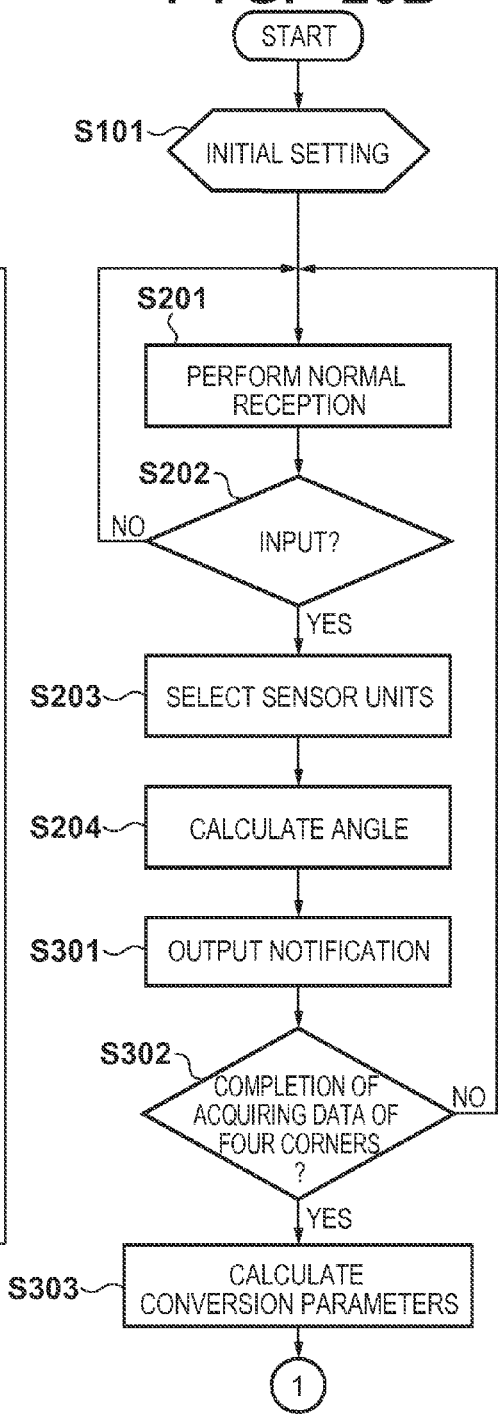

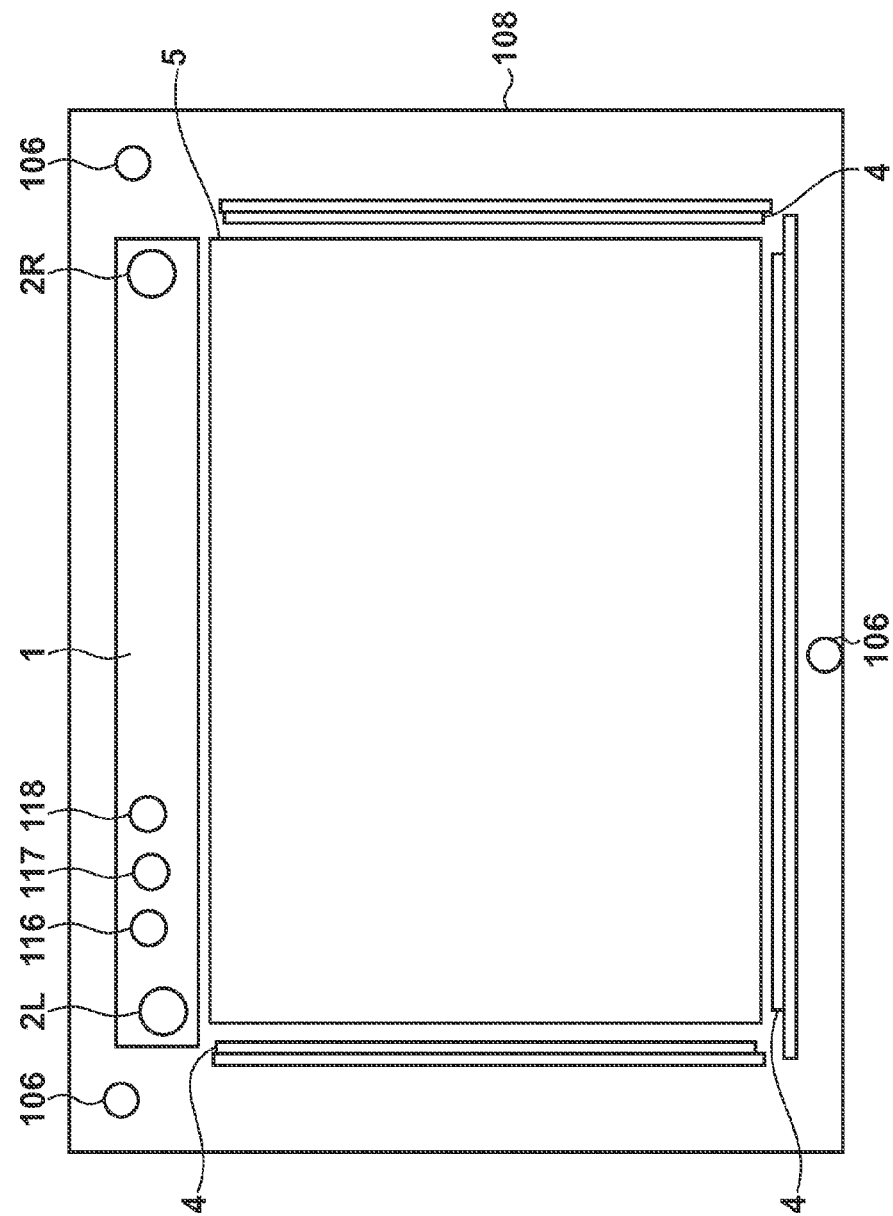

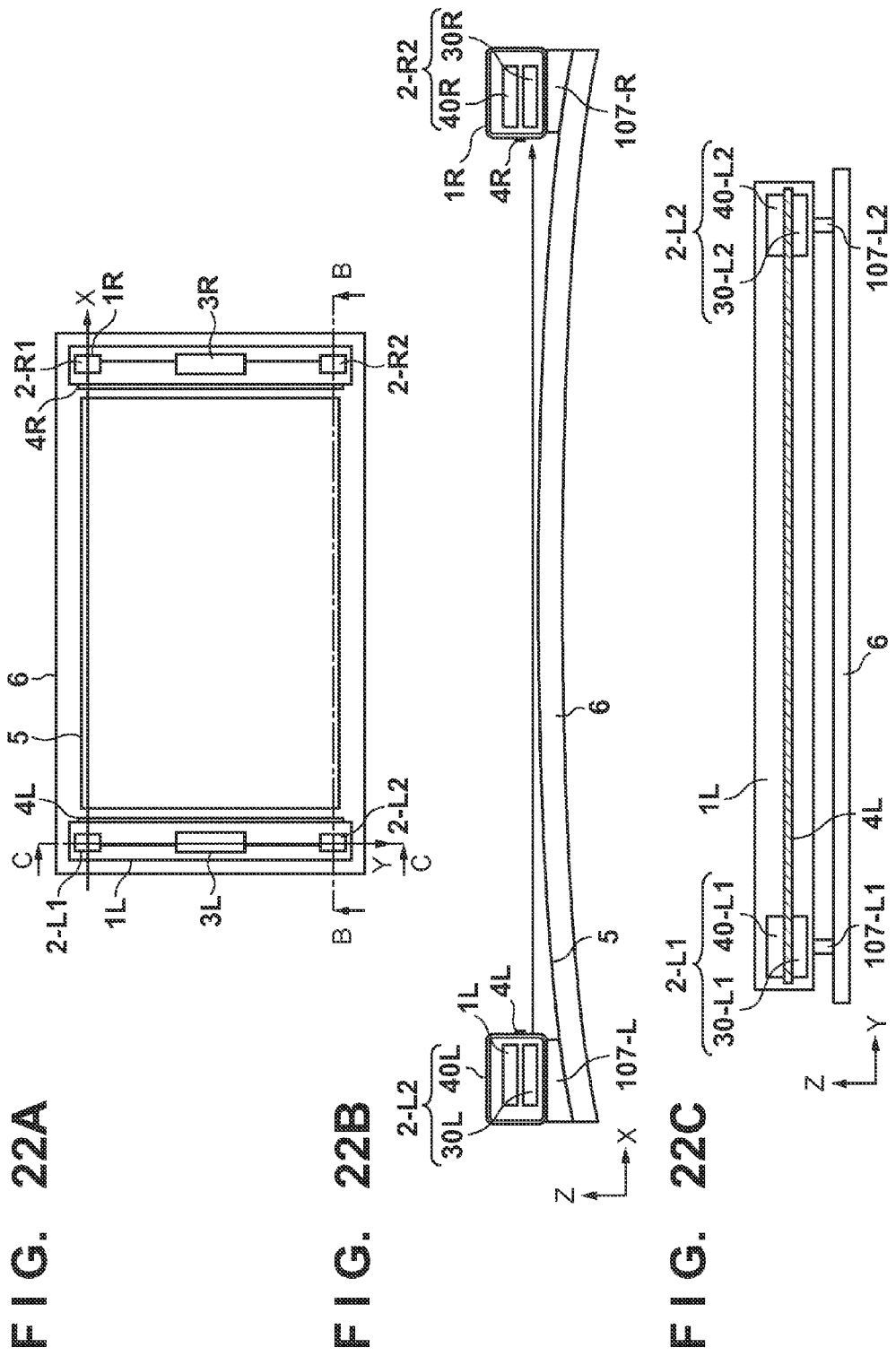

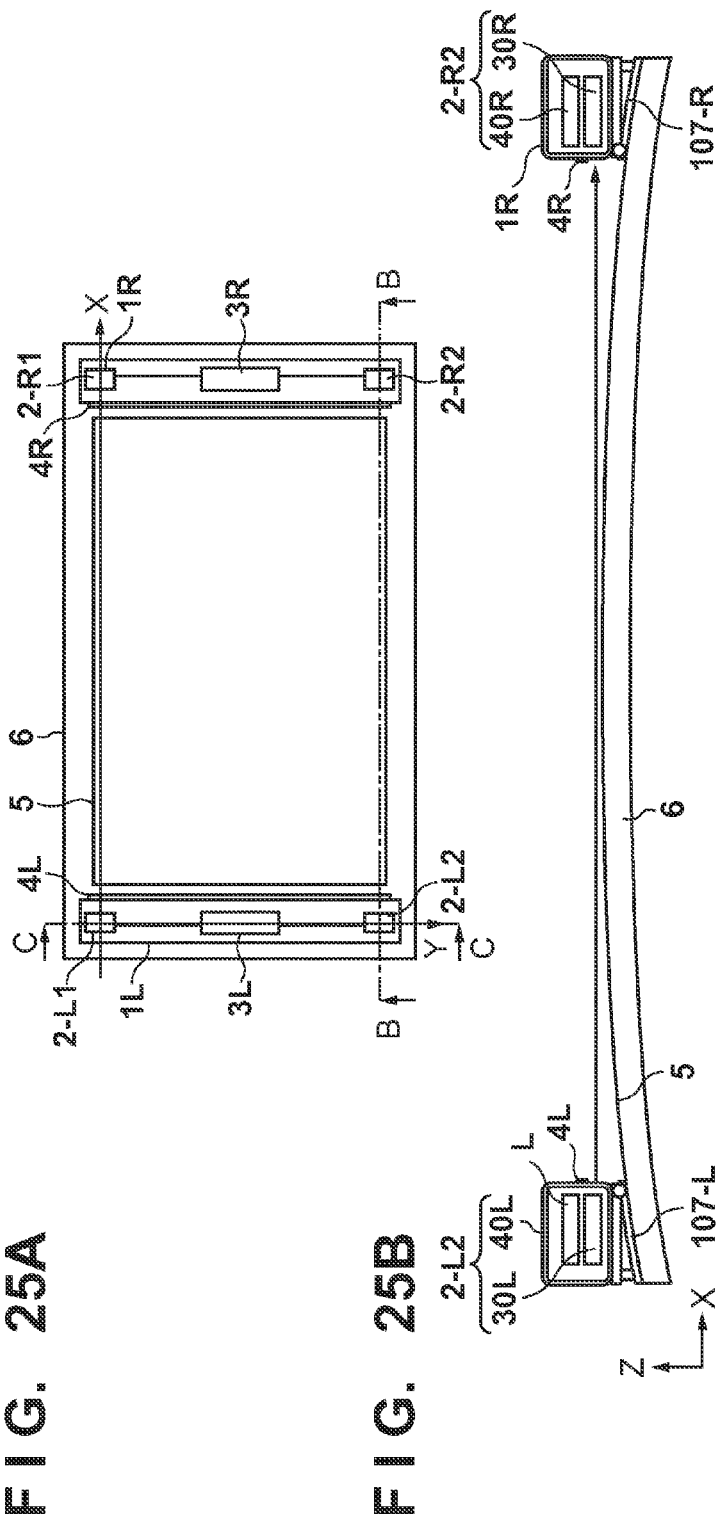

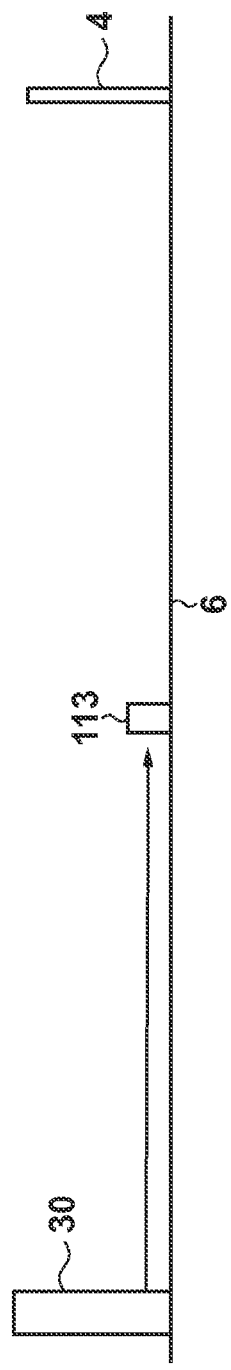
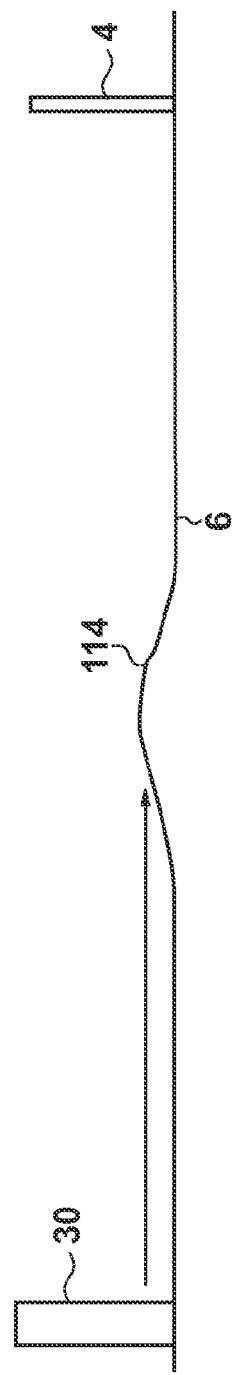

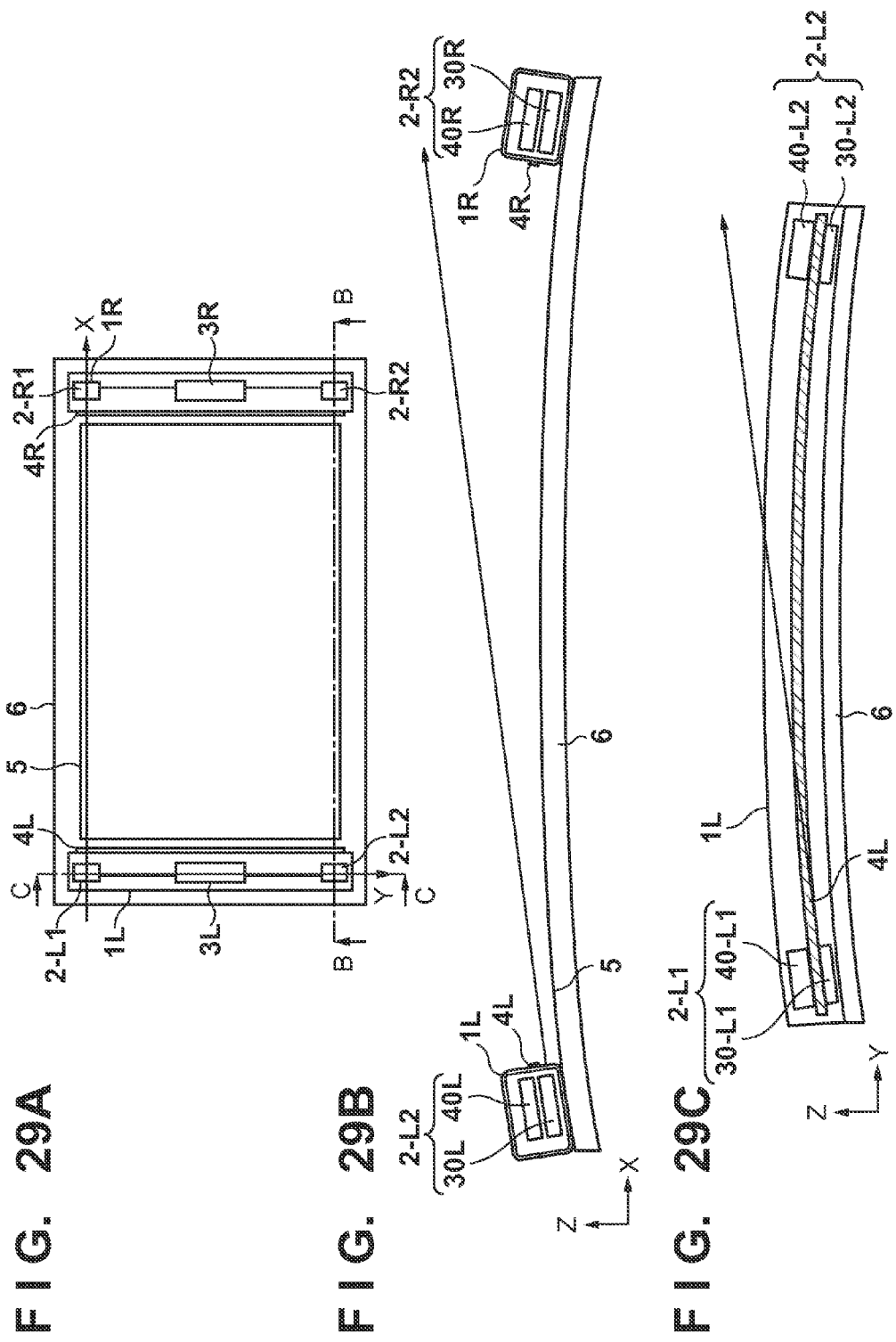

COORDINATE INPUT APPARATUS

BACKGROUND OF THE INVENTION

1. Field of the Invention

The present invention relates to a coordinate input apparatus which optically detects a coordinate position input to a coordinate input surface by a pointer such as a finger in order to input or select information. Particularly, the present invention relates to a detachable portable coordinate input apparatus.

2. Description of the Related Art

As such coordinate input apparatuses, various types of coordinate input apparatuses (touch panels and digitizers) have conventionally been proposed and commercialized. For example, a touch panel capable of easily operating a terminal such as a PC (Personal Computer) by touching the screen with a finger without using a special tool or the like is widely used.

Coordinate input methods range from a method using a resistive film to a method using an ultrasonic wave. As a method using light, there is known a method (light shielding method) of arranging a retroreflecting member outside a coordinate input surface, reflecting light from a light projecting unit by the retroreflecting member, and detecting the light amount distribution by a light receiving unit (see, for example, U.S. Pat. No. 4,507,557 and Japanese Patent Laid-Open No. 2004-272353). This method detects the direction of a light shielding portion (region) where light is cut off with a finger or the like in the coordinate input region, and determines the coordinates of the light shielding position, that is, coordinate input position.

FIG. 27 shows an arrangement as an example of generalizing the arrangement disclosed in the specification of U.S. Pat. No. 4,507,557. FIG. 27 shows sensor units 2L and 2R which are arranged at two ends of a coordinate input surface, and an effective coordinate input region 5 serving as a coordinate input surface used to input coordinates. A retroreflecting member 4 is arranged on three sides around the effective coordinate input region 5 to retroreflect incident light in the incident direction.

Each of the sensor units 2L and 2R includes a light projecting unit and light receiving unit (not shown). The light projecting unit projects light, which spreads in a fan-like shape almost parallelly to the input surface of the effective coordinate input region 5. The retroreflecting member 4 retroreflects the light, and the light receiving unit receives the return light. The coordinate input apparatus can calculate a touch position P input to the effective coordinate input region 5 based on the light shielding directions (light shielding angles θL and θR) of beams detected by the two sensor units 2L and 2R, and the distance between these sensor units.

As shown in FIG. 27, the field ranges of the sensor units 2L and 2R are symmetrically set by using the optical axis directions of the sensor units 2L and 2R as symmetry lines. In a coordinate input apparatus of this type using the lens optical system, if an angle formed with the optical axis increases, the optical performance always degrades under the influence of aberration. Employing a centered optical system can implement a higher-performance apparatus.

In FIG. 27, an arithmetic control circuit 3 controls the sensor units 2L and 2R, processes acquired output signals from the sensor units 2L and 2R, and outputs the processing result to an external apparatus.

Japanese Patent Laid-Open No. 2004-272353 exemplifies the detailed arrangements of the light projecting unit and light receiving unit of the sensor unit in the light shielding coordinate input apparatus disclosed in the specification of U.S. Pat. No. 4,507,557.

Further, Japanese Patent Laid-Open No. 2001-43021 discloses an arrangement which controls lighting of light projecting units in respective sensor units. More specifically, in Japanese Patent Laid-Open No. 2001-43021, it is controlled to alternately emit light from the light projecting units of the sensor units in order to prevent reception of light emitted by the light projecting unit of one sensor unit as disturbance light by the light receiving unit of the other sensor unit.

Further, Japanese Patent No. 4118664 discloses an arrangement in which a plurality of sensor units are arranged on two facing sides of an effective coordinate input region, and form a gap between a retroreflecting member and a coordinate input surface.

Integrating a coordinate input apparatus of this type with a display apparatus makes it possible to control the display state by touching the display screen of the display apparatus, or display the locus of a touch position as handwriting as in the relationship between paper and a pencil. As the display apparatus, flat panel displays and front projectors of various types such as a liquid crystal display are known. For the flat panel display, the above-mentioned operational environment can be implemented by superimposing a coordinate input apparatus on it. A mobile device such as a smartphone is a typical example of this. Along with upsizing of flat panel displays, it is becoming popular to combine the flat panel display with a large-size touch panel and introduce it into, for example, the digital signage field.

For the front projector capable of a large-size display, a position detection unit is assembled into a screen board or the like serving as its projection surface, and an image is projected onto the screen board. The size of the coordinate input apparatus depends on that of the screen board serving as a touch operation surface, and the apparatus becomes relatively large. In general, therefore, a stand for moving the screen board is attached to the screen board, or the screen board is fixed to the wall and used. A larger-size front projector exponentially raises the sales price, seriously inhibiting the spread of a large-size coordinate input apparatus and an application using it.

In the light shielding coordinate input apparatus shown in FIG. 27, the sensor units 2, arithmetic control circuit 3, and retroreflecting member 4 are main components and attached to the screen board. Even if the apparatus becomes large, the arrangement of the main components remains unchanged, and the cost of the material of the screen board occupies most part of the cost rise caused by upsizing.

A user interface operated by touching the display screen of a display apparatus is intuitive and usable by everyone and has gone mainstream in mobile devices now. Such an operation is requested of even an apparatus having a larger display screen.

Detailed applications of a large screen are mainly requested from markets such as ICT education in the classroom and digital signage as a presentation function at a meeting and a whiteboard function. To meet this demand, the introduction cost for implementing the operational environment needs to be greatly reduced.

In most current meeting rooms and classrooms, whiteboards and front projectors have already been introduced as equipment. The present invention has as its object to provide an operational environment capable of a touch operation at low cost even for a large screen by effectively using such apparatuses already purchased by the user.

As described above, the main building components of the light shielding coordinate input apparatus are at least two sensor units 2 which detect directions in which the optical path is cut off by a touch operation, the arithmetic control circuit 3, and the retroreflecting member 4. If these main building components can be attached to, for example, a whiteboard at predetermined positions and sizes, a touch position on the whiteboard can be detected. Using an existing whiteboard as the screen board can omit, from indispensable building components, the screen board itself which occupies most of the cost. This can greatly suppress the product price and provide a touch operation environment at low cost even for a large screen.

The position detection principle of the light shielding coordinate input apparatus geometrically calculates a touch position based on light shielding directions (=angles) of the touch position output from at least two sensor units, and distance information between these sensor units. To detect a touch position at high accuracy, the sensor units need to be positioned and attached at high accuracy. It can be that the user can easily attach these sensor units.

In contrast, even rough positioning and attachment of the sensor units by the user can implement the following usage if high-accuracy touch position detection is possible. More specifically, only the main building components of the light shielding coordinate input apparatus are carried, and used by easily attaching them within a short time to a whiteboard installed in a meeting room where a meeting is held. After the end of the meeting, the main building components are detached and carried back, or carried to another meeting room and used there. In short, a detachable portable coordinate input apparatus can be operated by "everybody" at any time "anywhere" "easily". The number of building components of a product itself for implementing this can be small. Further, the product is compact and lightweight for portability.

Since the main building components can be attached and detached, they can be attached to, for example, an already purchased whiteboard by using magnets. Using the whiteboard as the projection surface can provide an input/output integrated touch operation environment. In general, whiteboards of various sizes are commercially available. By using a larger-size whiteboard, an image can be projected onto a larger display surface, needless to say. It can be that the main building components can be set in accordance with various sizes of whiteboards installed in meeting rooms and can detect a touch position at high accuracy.

However, when a commercially available whiteboard is used or when the wall or the like is used as the projection surface, it is not always guaranteed that the whiteboard is flat or there is no projection on the wall or the like. In other words, the commercially available whiteboard, or the wall or the like may be in states shown in FIGS. 28A and 28B. More specifically, a projection 113 may exist on a whiteboard 6 serving as the projection surface such as the wall, as shown in FIG. 28A, or the projection surface of the whiteboard 6 may flex and generate a flexural bump 114. This causes a trouble when the light shielding coordinate input apparatus is attached to a commercially available whiteboard which may not keep flat, or the wall or the like on which a projection or the like exists. FIGS. 28A and 28B explain the trouble. As shown in FIGS. 28A and 28B, light emitted by a light projecting unit 30 is cut off by the projection 113 or flexural bump 114. This situation degrades the performance of the light shielding coordinate input apparatus.

FIGS. 29A to 29C are views showing a curved whiteboard as an example of losing the flatness of the whiteboard.

FIG. 29A is a front view showing a coordinate input apparatus when the whiteboard is viewed from the front. FIG. 29B is a sectional view taken along a line B-B in FIG. 29A, and FIG. 29C is a sectional view taken along a line C-C in FIG. 29A.

When the whiteboard 6 is curved in the X direction as in FIG. 29B, if sensor bars 1L and 1R are set, sensor units 2-L2 and 2-R2 do not face straight, and project infrared light forward upward. Light emitted by a light projecting unit 30L (or 30R) does not hit a retroreflecting member 4R (or 4L), and a light receiving unit 40R (or 40L) cannot receive the light from the light projecting unit 30L (or 30R).

When the whiteboard 6 is curved in the Y direction as in FIG. 29C, if the sensor bar 1L is set, the housing of the sensor bar 1L is deformed along the whiteboard 6 and set. Since the sensor units 2-L2 and 2-L2 are fixed at the angles of set portions, light projected by a light projecting unit 30-L1 (or 30-L2) is projected parallelly to the angle. The retroreflecting member 4L is set in the sensor bar 1L and thus deformed together with the sensor bar 1L. Depending on an angle in the plane of the whiteboard 6, light emitted by the sensor unit 2-L1 (or 2-L2) has an angle at which the light hits the facing retroreflecting member 4R and an angle at which it does not hit the facing retroreflecting member 4R. For this reason, a light receiving unit 40-L2 (or 40-L1) cannot detect the entire effective coordinate input region 5.

This situation degrades the performance of the light shielding coordinate input apparatus.

The present invention provides a coordinate input apparatus in which an existing whiteboard or the wall surface of a meeting room or the like is used as a projection surface and the display surface can be controlled by touching the projection surface.

SUMMARY OF THE INVENTION

To achieve the above object, a coordinate input apparatus according to the present invention has the following arrangement.

More specifically, a coordinate input apparatus which detects a pointed position to an effective coordinate input region, comprising: a light projecting unit configured to project light parallelly to the effective coordinate input region; a reflection unit configured to retroreflect the light projected by the light projecting unit; a light receiving unit configured to receive light from one of the light projecting unit and the reflection unit; and a moving unit configured to move a set of the light projecting unit, the light receiving unit, and the reflection unit in a direction perpendicular to the effective coordinate input region in order to ensure a light amount with which the pointed position in the effective coordinate input region can be calculated based on a variation of a light amount distribution obtained from the light receiving unit.

The present invention having the above-described arrangement can provide a coordinate input apparatus in which an existing whiteboard or the wall surface of a meeting room or the like is used as a projection surface and the display surface can be controlled by touching the projection surface.

Further features of the present invention will become apparent from the following description of exemplary embodiments (with reference to the attached drawings).

BRIEF DESCRIPTION OF THE DRAWINGS

FIG. 1A is a view for explaining a coordinate input apparatus according to the first embodiment;

FIG. 1B is a view for explaining the coordinate input apparatus according to the first embodiment;

FIG. 2 is an exploded perspective view showing a height adjustment unit according to the first embodiment;

FIG. 10A is a view showing the detailed arrangement of a sensor unit according to the first embodiment;

FIG. 10B is a view showing the detailed arrangement of the sensor unit according to the first embodiment;

FIG. 10C is a view showing the detailed arrangement of the sensor unit according to the first embodiment;

FIG. 11A is a view for explaining the field ranges of a light projecting unit and light receiving unit according to the first embodiment;

FIG. 11B is a graph for explaining the field ranges of the light projecting unit and light receiving unit according to the first embodiment;

FIG. 11C is a graph for explaining the field ranges of the light projecting unit and light receiving unit according to the first embodiment;

FIG. 11D is a graph for explaining the field ranges of the light projecting unit and light receiving unit according to the first embodiment;

FIG. 15B is a view for explaining coordinate calculation according to the first embodiment;

FIG. 15C is a view for explaining coordinate calculation according to the first embodiment;

FIG. 15D is a view for explaining coordinate calculation according to the first embodiment;

FIG. 15E is a view for explaining coordinate calculation according to the first embodiment;

FIG. 15F is a view for explaining coordinate calculation according to the first embodiment;

FIG. 19 is a flowchart showing initial setting processing according to the first embodiment;

FIG. 20A is a flowchart showing a normal operation and calibration processing according to the first embodiment;

FIG. 20B is a flowchart showing a normal operation and calibration processing according to the first embodiment;

FIG. 21 is a view showing the arrangement of a coordinate input apparatus according to the second embodiment;

FIG. 22A is a view for explaining a coordinate input apparatus according to the third embodiment;

FIG. 22B is a view for explaining the coordinate input apparatus according to the third embodiment;

FIG. 22C is a view for explaining the coordinate input apparatus according to the third embodiment;

FIG. 25A is a view for explaining a coordinate input apparatus according to the fourth embodiment;

FIG. 25B is a view for explaining the coordinate input apparatus according to the fourth embodiment;

FIG. 25C is a view for explaining the coordinate input apparatus according to the fourth embodiment;

FIG. 28A is a view for explaining a conventional optical coordinate input apparatus;

FIG. 28B is a view for explaining the conventional optical coordinate input apparatus;

FIG. 29A is a view for explaining a conventional optical coordinate input apparatus having a curved input surface;

FIG. 29B is a view for explaining the conventional optical coordinate input apparatus having the curved input surface; and FIG. 29C is a view for explaining the conventional optical coordinate input apparatus having the curved input surface.

DESCRIPTION OF THE EMBODIMENTS

Embodiments of the present invention will now be described in detail with reference to the accompanying drawings. Note that arrangements set forth in the following embodiments are merely examples, and the present invention is not limited to illustrated arrangements.

First Embodiment

FIGS. 1A and 1B are views for explaining a coordinate input apparatus according to the first embodiment.

Figure 8:
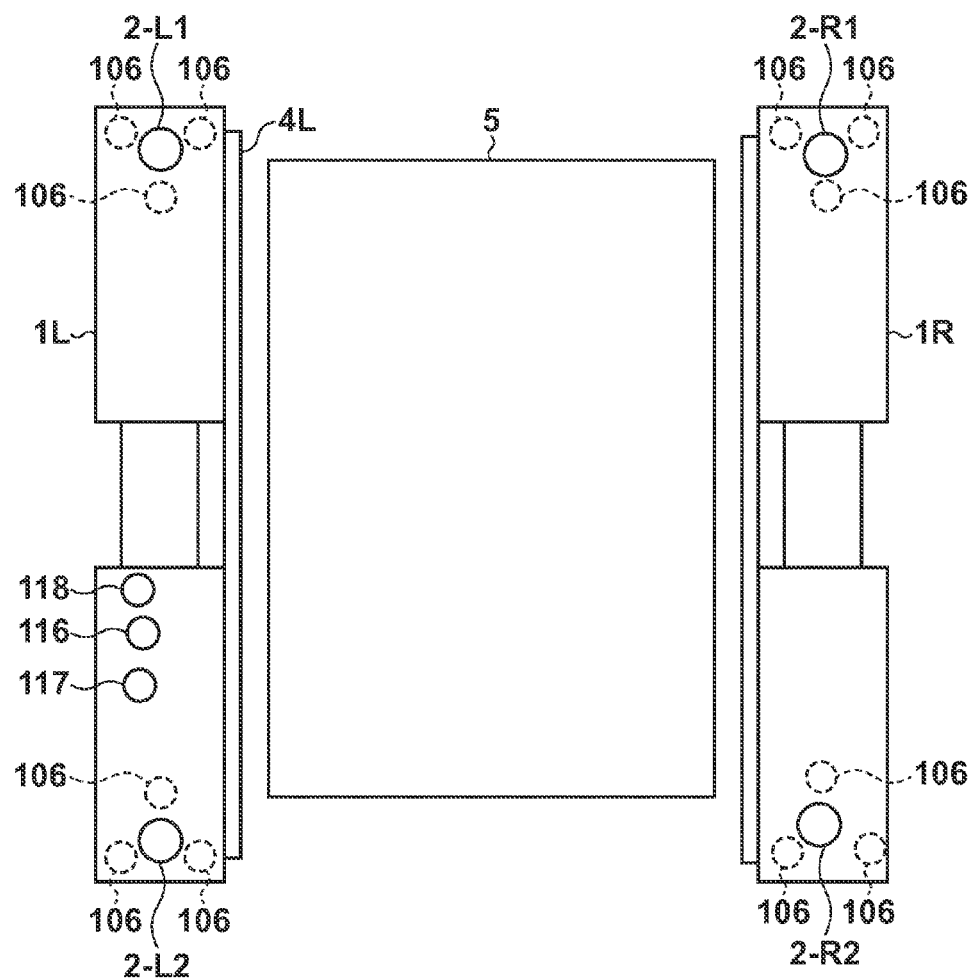
FIG. 8 is a view showing the arrangement of a sensor bar according to the first embodiment.
Figure 9:
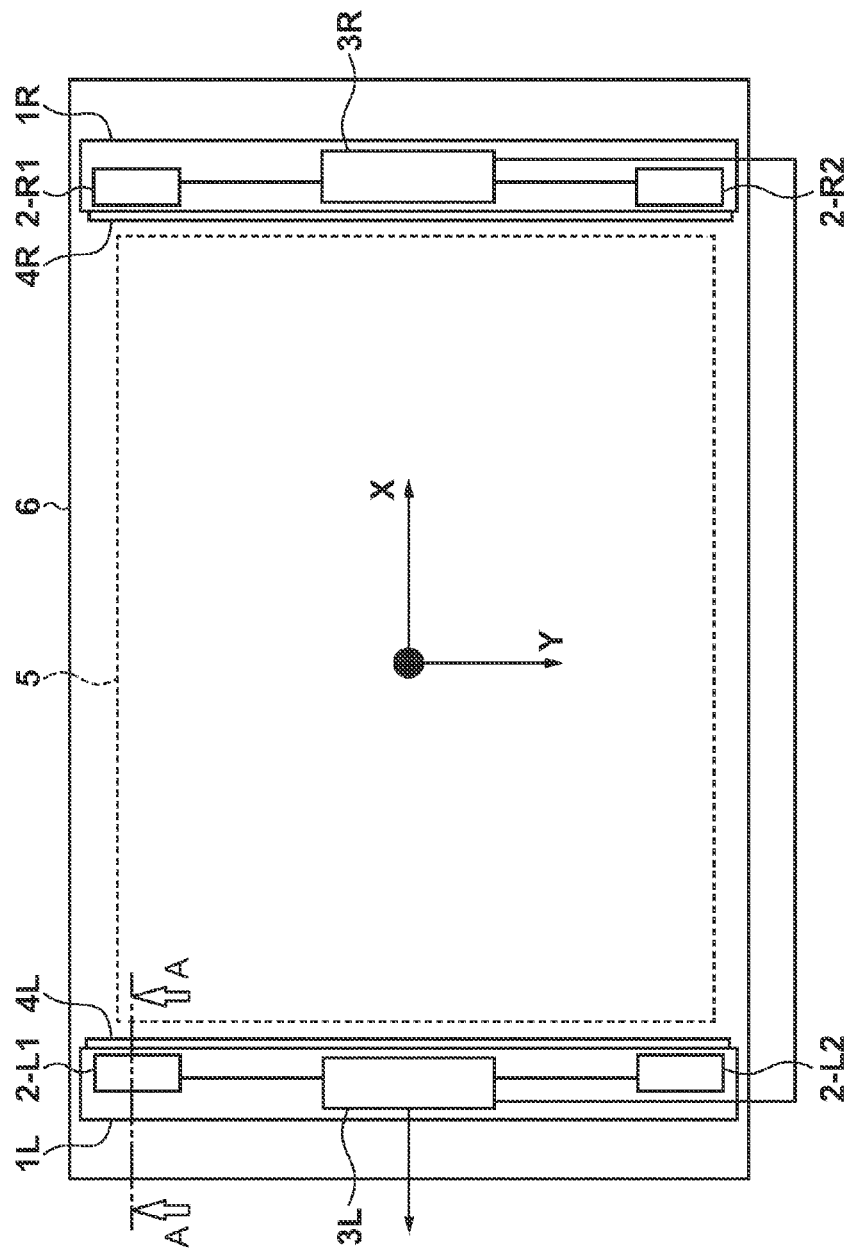
FIG. 9 is a view showing the schematic arrangement of the coordinate input apparatus according to the first embodiment.

FIGS. 1A and 1B are side views of sensor bars 1L and 1R serving as housings each of which stores at least two sensor units 2 (shown in FIGS. 8 and 9). Note that details of the sensor bars will be described with reference to FIG. 9 and subsequent drawings.

Each of the sensor bars 1L and 1R (to be generically referred to as sensor bars 1) includes a light projecting unit (light emitting unit) 30, a light receiving unit (detection unit) 40, a retroreflecting member 4L or 4R, and height adjustment units 106. Light emitted by the light projecting unit 30 in the sensor bar 1L is retroreflected by the retroreflecting member 4R mounted on the sensor bar 1R, and returns the light receiving unit 40 in the sensor bar 1L. At this time, no problem occurs when the surface of a whiteboard 6 is flat. However, if there is a projection 113, flexural bump 114, or the like, as shown in FIGS. 28A and 28B, it affects the performance.

To prevent this, the height adjustment units 106 in FIGS. 1A and 1B are operated to simultaneously adjust the heights of the light projecting units 30, light receiving units 40, and retroreflecting members 4L and 4R (to be generically referred to as retroreflecting members 4). Accordingly, while keeping projected light, received light, and the whiteboard 6 parallel, the height of the sensor bar 1 from the whiteboard 6 can be changed from a height B in FIG. 1A to a height C in FIG. 1B. That is, B<C can be set. Setting B<C can provide an arrangement in which neither emitted light nor received light is cut off by an obstacle such as the projection 113 or flexural bump 114 shown in FIG. 28A or 28B.

Next, the embodiment of the height adjustment unit 106 will be explained with reference to the exploded perspective view of FIG. 2.

Reference numeral 100 denotes part of the housing of the height adjustment unit 106. Recesses 100b1, 100b2, and 100b3 fix a rib 104a of a height adjustment setting member 104 so that the rib 104a clicks upon fixing. Reference numeral 100c denotes a slope rib; 100d, a stopper rib; 100a, an internal thread; 101, a height adjustment member; 101a, an external thread; and 101b and 101c, threaded portions. Reference numeral 102 denotes a magnet; 103 and 105, countersunk head screws; 104c, a threaded hole; 104b, a projection; 104d, a stopper; and 106, the height adjustment unit.

First, the magnet 102 is fixed to the threaded portion 101c by using the countersunk head screw 103. The magnet 102 is used to detachably set the device on the whiteboard 6 or the like by using the magnetic force. Then, the external thread 101a of the height adjustment member 101 is inserted into the internal thread 100a and screwed clockwise until the rotation stops. At this time, the height adjustment member 101 has a smallest amount of projection from the housing 100 of the device.

The height adjustment setting member 104 is put on the height adjustment member 101, and the countersunk head screws 105 are inserted into the threaded holes 104c and fixed to the threaded portions 101b. In this state, the rib 104a functions as a rotation stopper which is fitted in the recess 100b1. Since the projection 104b is elastic, when the height adjustment setting member 104 is rotated counterclockwise, the rib 104a is fitted and fixed in the recesses 100b2 and 100b3 while clicking. The stopper 104d then hits against the stopper rib 100d, and the height adjustment setting member 104 does not rotate counterclockwise anymore. In the embodiment, the height can be adjusted at two steps. However, the number of height steps and the height adjustment amount are not limited to them and arbitrary.

Figure 4:
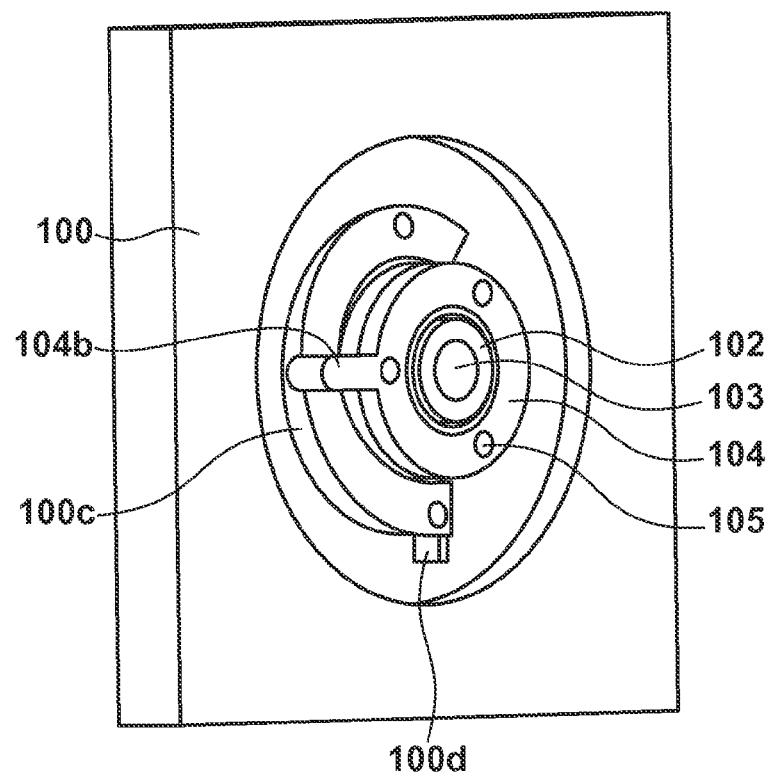
FIG. 4 is a perspective view showing the height adjustment unit according to the first embodiment.
Figure 5:
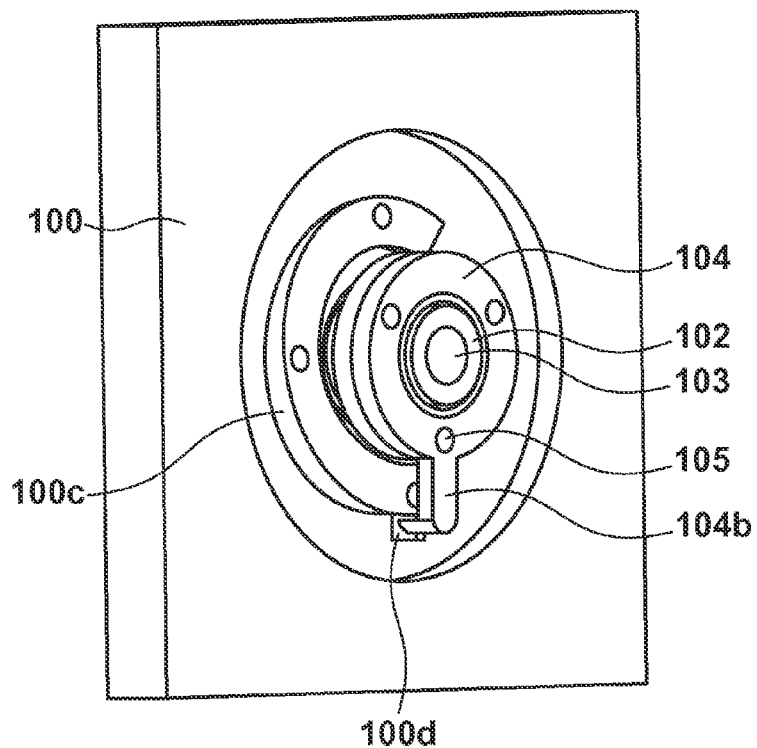
FIG. 5 is a perspective view showing the height adjustment unit according to the first embodiment.

The embodiment will be explained in more detail. When the pitch of the external thread 101a of the height adjustment member 101 is, for example, 10 mm, the projection amount of the height adjustment member 101 from the housing 100 of the device increases by 2.5 mm in the state of FIG. 3. In the state of FIG. 4, the projection amount of the height adjustment member 101 from the housing 100 of the device increases by 5 mm. As shown in FIG. 5, when the rotational positions of the height adjustment setting members 104 are adjusted to the same position (for example, the stopper ribs 100d) in all the height adjustment units 106, sets each of the light projecting unit 30, light receiving unit 40, and retroreflecting member 4 can be adjusted by the same moving amount.

Figure 7:
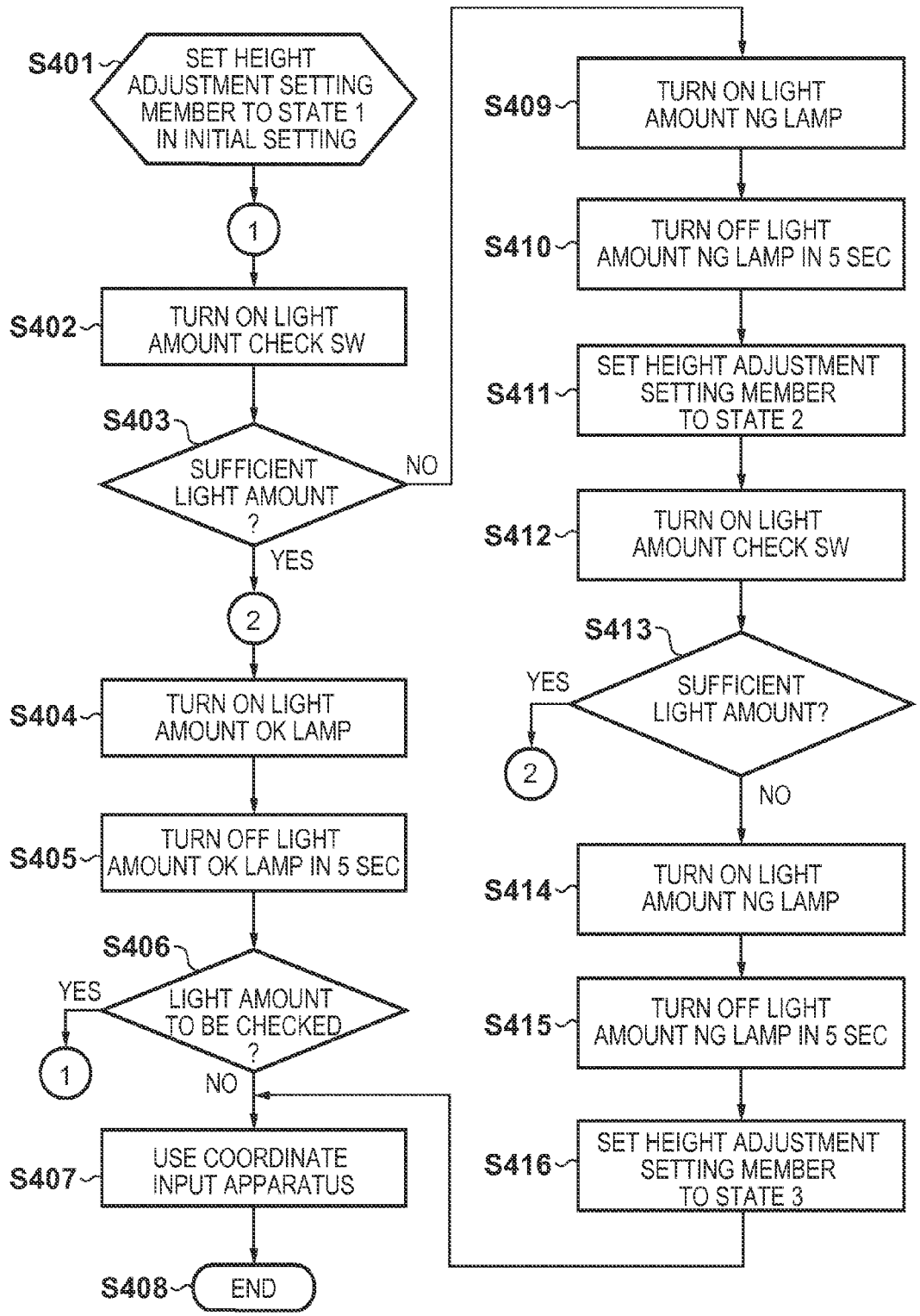
FIG. 7 is a flowchart showing processing regarding height adjustment by the height adjustment unit according to the first embodiment.

Next, processing regarding height adjustment in the present invention will be explained with reference to the flowchart of FIG. 7.

This flowchart explains the embodiment (the height adjustment unit 106 capable of adjusting the height at two steps). However, the flowchart is applicable to even multistep height adjustment, and the number of steps is changeable depending on the situation.

Figure 3:
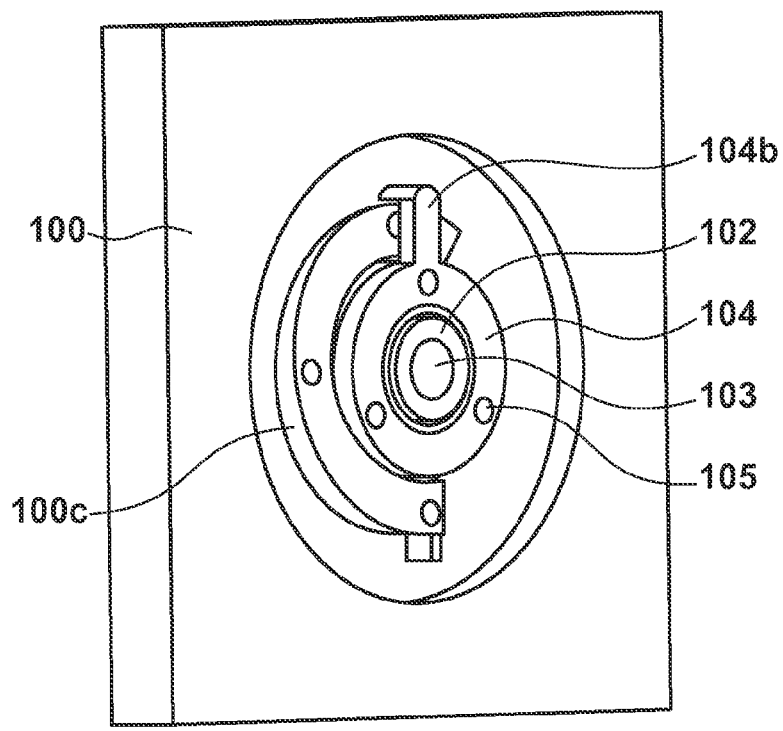
FIG. 3 is a perspective view showing the height adjustment unit according to the first embodiment.
Figure 6:
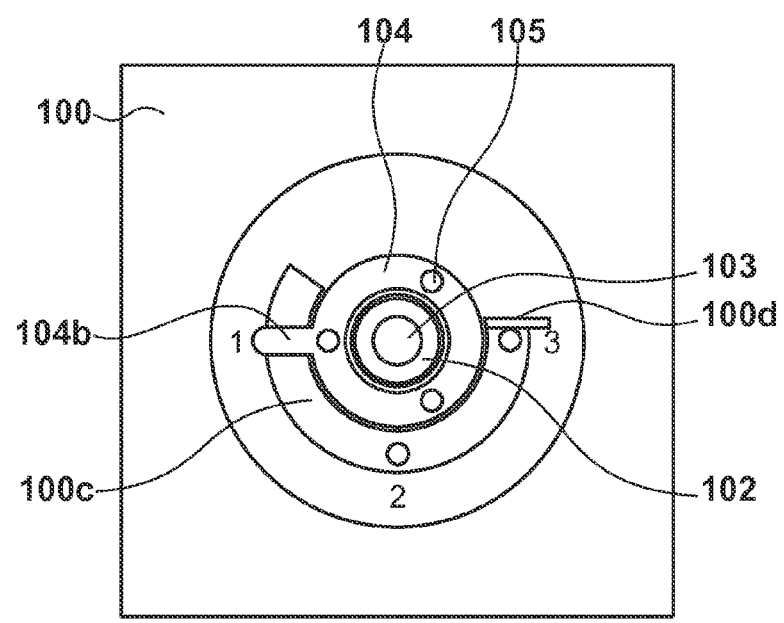
FIG. 6 is a front view showing the height adjustment unit according to the first embodiment.

First, the height adjustment setting members 104 of all the height adjustment units 106 of the device are set to the state shown in FIGS. 3 and 6, that is, a state (state 1) in which the projection 104b is set to a position of number 1 (step S401). In this state, the projection amount of the height adjustment member 101 is smallest.

Note that number displays 1 to 3 shown in FIG. 6 which are printed or inscribed on the housing 100 of the height adjustment unit 106 function as display portions each displaying a moving amount of the height adjustment unit. The user visually checks a number displayed at a position where the projection 104b is set, and can grasp the current moving amount (height) of the height adjustment unit serving as a moving unit.

Then, a light amount check switch (SW) 118 shown in FIG. 8 is turned on (step S402). It is determined whether the light receiving unit 40 receives light reflected by the retroreflecting member 4 in FIGS. 1A and 1B by an amount sufficient for performance, that is, whether the received light amount is appropriate for performance (step S403). This determination is made based on whether the maximum light amount in the received light amount distribution is equal to or larger than a preset threshold. If the maximum light amount is equal to or larger than the preset threshold, it is determined that the light amount is sufficient; if it is smaller than the preset threshold, it is determined that the light amount is insufficient. If the light amount is sufficient (YES in step S403), a light amount OK lamp 116 shown in FIG. 8 is turned on as a notification unit which notifies the determination result (step S404). The light amount OK lamp 116 is turned off in 5 sec (step S405). The lights-out time is set depending on the situation.

After that, it is determined whether to check the light amount (step S406). If it is determined to check the light amount (YES in step S406), the process returns to step S402. If it is determined not to check the light amount (NO in step S406), the coordinate input apparatus is used soon (step S407). After the end of using the coordinate input apparatus, the process ends (step S408).

Note that whether to check the light amount is determined based on, for example, the presence/absence of a predetermined operation (long press for a predetermined time) to the light amount check switch (SW) 118.

If the light amount is insufficient in step S403 (NO in step S403), a light amount NG lamp 117 shown in FIG. 8 is turned on as a notification unit which notifies the determination result (step S409). The light amount NG lamp 117 is turned off in 5 sec (step S410). The lights-out time is set depending on the situation. In the state of step S410, the light amount is insufficient, and the device is unusable. To ensure the light amount, the state of FIG. 4 is set, that is, the height adjustment setting member 104 is set to a position of number 2 (state 2) in FIG. 6 (step S411). That is, the height is adjusted by one step.

Then, the light amount check SW 118 shown in FIG. 8 is turned on (step S412). It is determined whether the light receiving unit 40 receives light reflected by the retroreflecting member 4 in FIGS. 1A and 1B by an amount sufficient for performance (step S413).

If the light amount is sufficient (YES in step S413), the process advances to step S404. If it is determined in step S413 that the light amount is insufficient (NO in step S413), the light amount NG lamp 117 shown in FIG. 8 is turned on (step S414). The light amount NG lamp 117 is turned off in 5 sec (step S415). The lights-out time is set depending on the situation. In the state of step S415, the light amount is insufficient, and the device is unusable. To ensure the light amount, the height adjustment setting member 104 is set to a position of number 3 (state 3) in FIG. 6 (step S416). That is, the height is adjusted by one more step. The process advances to step S407 to shift to the use of the coordinate input apparatus.

Next, the schematic arrangement of the coordinate input apparatus according to the present invention will be explained with reference to FIG. 9.

As shown in FIG. 9, the sensor bars 1L and 1R are arranged on two facing sides of a rectangular effective coordinate input region 5. If the display apparatus is a front projector, the display region is set within the range of the effective coordinate input region 5 and projected onto, for example, the flat whiteboard 6. As a matter of course, the projection surface is not limited to the whiteboard 6 and may be a wall surface or the like.

As shown in FIG. 9, the retroreflecting members 4L and 4R are mounted on the side surfaces of the sensor bars 1L and 1R, respectively. The retroreflecting members 4L and 4R are configured to retroreflect infrared light projected from the sensor units of the sensor bars 1R and 1L arranged on facing sides.

The sensor bar 1L incorporates sensor units 2-L1 and 2-L2, and the sensor bar 1R incorporates sensor units 2-R1 and 2-R2. An arithmetic control circuit 3L incorporated in the sensor bar 1L controls the sensor units 2-L1 and 2-L2, performs arithmetic processing for the output results, and controls an arithmetic control circuit 3R of the sensor bar 1R. The arithmetic control circuit 3R of the sensor bar 1R controls the sensor units 2-R1 and 2-R2, performs arithmetic processing for the output results, and transmits the results to the arithmetic control circuit 3L of the sensor bar 1L. The arithmetic control circuit 3L of the sensor bar 1L processes output results from the four sensor units 2-L1, 2-L2, 2-R1, and 2-R2, calculates a touch position, and outputs the results to an external device such as a personal computer.

In FIG. 9, the arithmetic control circuit 3L of the sensor bar 1L and the arithmetic control circuit 3R of the sensor bar 1R are connected by a cord (that is, wired connection), but the present invention is not limited to this. For example, the arithmetic control circuits 3L and 3R may have a wireless communication function and transmit/receive data using the communication functions (wireless connection).

In the following description, the horizontal direction is the X-axis (positive on the right side in the drawing), and the vertical direction is the Y-axis (positive on the down side).

FIGS. 10A to 10C are views showing the detailed arrangement of the sensor units 2-L1, 2-L2, 2-R1, and 2-R2 (to be generically referred to as sensor units 2). FIG. 10A is a sectional view taken along a line A-A in FIG. 9, and FIGS. 10B and 10C are front views when viewed from a direction indicated by an arrow in FIG. 10A.

In FIG. 10A, the sensor unit 2 is stored in the sensor bar 1 and formed from the light projecting unit 30 and light receiving unit 40. The distance between the light projecting unit 30 and the light receiving unit 40 is L_pd, and the retroreflecting member 4 is interposed between them as shown in FIG. 10A. A light transparent member 45 is a protection member for preventing entrance of a foreign substance such as dust into the sensor bar 1.

In FIG. 10B, the light projecting unit 30 includes an infrared LED 31 serving as a light emitting unit, a projection lens 32, and an adhesion layer 33 for fixing them. The projection lens 32 is configured to change light from the infrared LED 31 into a beam almost parallel to the whiteboard 6 serving as the coordinate input surface. The light projecting unit 30 emits a fan-like beam having a vertex at the position of a point O (the barycentric position of the sensor unit 2) in a light projecting range of g to h so as to illuminate the entire region of the retroreflecting member 4 of the sensor bar 1 arranged on a facing side. At this time, the optical axis of the light projecting unit 30 is set in the direction f, the reason of which will be described later.

In FIG. 10C, the light receiving unit 40 detects light which has been projected by the light projecting unit 30 and retroreflected by the retroreflecting member 4 mounted in the sensor bar 1 arranged on a facing side. Reference numeral 41 denotes a line CCD serving as a photoelectric converter; 42, a light receiving lens; 43, a field stop; and 44, an infrared pass filter. The infrared pass filter 44 may be omitted by giving the infrared pass filter function may be given to a protection member 45.

The optical axis of the light receiving unit 40 is set in the X-axis direction. The field range is a range of g to h, and the position of the point O serves as an optical center position. As shown in FIG. 10C, the light receiving unit 40 is an optical system asymmetric to the optical axis. The light projecting unit 30 and light receiving unit 40 are arranged to overlap each other, as shown in FIG. 10A, so that the positions of the points O, the directions g, and the directions h substantially coincide with each other. Since the light receiving unit 40 condenses light to a pixel of the line CCD 41 in accordance with the direction of incident light, the pixel number of the line CCD 41 represents angle information of incident light.

FIG. 11A is a view showing the schematic arrangement of the coordinate input apparatus and the arrangement of the optical system of the light projecting unit 30 and light receiving unit 40. The range in which the light projecting unit 30 of the sensor bar 1L projects light toward the retroreflecting member 4R mounted on the sensor bar 1R arranged on a facing side is a range of g to h. Light in a direction in a range of j to f in which the retroreflecting member 4R is actually mounted is retroreflected and detected by the light receiving unit 40.

Beams of light projected by the light projecting unit 30 schematically shown in FIG. 10A do not become completely parallel, and as the light projecting distance increases, the beam width increases. Hence, the amount of light retroreflected by the retroreflecting member 4R decreases as the distance to the retroreflecting member 4R increases. Thus, the retroreflection efficiency becomes poor in the direction f in which the distance from the light projecting point O to the retroreflecting member 4R is long, compared to the direction j in which the distance is short.

Further, the retroreflection efficiency of the retroreflecting member 4R decreases as the incident angle increases, compared to a case in which light hits the retroreflecting surface perpendicularly. In other words, the ratio at which light reaching the retroreflecting member 4R is retroreflected as retroreflected light depends on the incident angle, and the direction f is a direction in which the retroreflection efficiency becomes lowest.

The optical axis of the light receiving unit 40 is set in the direction X, and the direction f is a direction in which an angle formed with the optical axis becomes largest. It is known that the lens characteristic of a general optical lens degrades the performance as an angle formed with the optical axis becomes larger. Owing to a decrease in light collection efficiency in the direction f, this direction is a direction in which light becomes darkest.

From this, even if the light projecting unit 30 can project light at a predetermined intensity regardless of the direction, retroreflected light detectable by the light receiving unit 40 becomes weak as the direction changes from the direction j toward the direction f, compared to retroreflected light returned from the direction j (see FIG. 11B).

In contrast, the infrared LED 31 is generally configured to maximize the radiation intensity of light in the optical axis direction. As an angle formed with the optical axis increases, the radiation intensity decreases. In general, the degree of decrease is defined by an angle "half-value angle" at which the radiation intensity becomes half the illumination intensity in the optical axis direction (see FIG. 11C).

Considering this, the optical axis of the light projecting unit 30 is pointed in the direction f in which the retroreflected light level is lowest. This increases the illumination intensity in the direction f, and decreases the illumination intensity as the direction relatively changes from the direction f to the direction j. Since the intensity of detectable retroreflected light can be uniformed between the direction j and the direction f (see FIG. 11D), a more stable signal can be obtained regardless of the direction.

In the embodiment, based on the radiation intensity distribution of the infrared LED 31, the optical axis of the light projecting unit 30 is pointed in the direction f in which the retroreflected light level is lowest. However, the angle of inclination of the light projecting unit 30 with respect to the light receiving unit 40 is not limited to this. For example, when an optical system in which the optical axis of the projection lens 32 itself becomes asymmetric is mounted, the light amount distribution and the radiation intensity distribution in FIG. 11C also become asymmetric. In this case, the angle of inclination of the light projecting unit 30 with respect to the light receiving unit 40 may be set so that a direction in which the asymmetric distribution becomes maximum coincides with the direction f.

Details of the arrangement of the sensor bar 1L will be explained with reference to FIGS. 12A to 12C. Although the sensor bar 1L receives attention and is explained with reference to FIGS. 12A to 12C, the sensor bar 1R also has the same arrangement.

As described above, a purpose of the apparatus is to attach the two sensor bars 1L and 1R to, for example, a flat whiteboard or wall surface so that the user can directly touch and operate a display screen projected on the whiteboard or wall surface. The size of the display screen is arbitrarily set by the user in accordance with the size of the whiteboard or that of the wall surface, and is not a fixed value. Further, whiteboards of various sizes are commercially available, and standard sizes capable of projecting a large screen as the projection screen are dimensions of 900×1,200 mm, 900×1,800 mm, and 1,200×1,800 mm.

However, these dimensions do not define ranges effectively used as the whiteboard, and are often dimensions containing the housing frame around the four sides of the whiteboard 6. An actually usable flat region is smaller, and its size varies depending on the manufacturer under the present circumstances.

To cope with this, in the coordinate input apparatus according to the present invention, a stretching/contraction mechanism is arranged in the sensor bar 1 so that the length of the sensor bar 1, in other words, the distance between the sensors of the two sensor units 2 incorporated in the sensor bar 1 is changeable. In practice, the outer length of the sensor bar 1 can be changed from 820 mm to 1,200 mm so that the sensor bar 1 can be attached to a flat portion having a size of 820 mm to 1,200 mm in a whiteboard having a vertical dimension of 900 mm to 1,200 mm.

In FIG. 9, the stretching/contraction amount is set based on the vertical dimension of the whiteboard on the assumption that the sensor bars are attached at two, left and right portions to the whiteboard. However, the present invention is not limited to this. For example, assuming that the sensor bars are attached not at two, left and right portions but at two, upper and lower portions to the whiteboard, the maximum dimension of the sensor bar 1 upon stretching is set to be longer. Further, assuming that the sensor bars are used even for a larger screen projected on a wall surface or the like, the stretching/contraction amount of the sensor bar is set in accordance with the size of an assumed maximum display screen.

In the present invention, when the sensor bars are assumed to be attached to a whiteboard, attaching the sensor bars at left and right portions is considered to be superior to attaching them at upper and lower portions.

As the first reason, considering the aspect ratio of the display apparatus and that of the whiteboard, when a maximum display region is set on the whiteboard, blank portions (regions where nothing is displayed) are generated in the left and right regions of the whiteboard. Hence, setting the sensor bars 1 at the blank portions can prevent a problem that the sensor bars 1 downsize a display image. In other words, an operational environment capable of using a larger screen can be provided.

The second reason is as follows. Generally, the display screen is horizontally elongated at an aspect ratio of 16:9 or the like. To enable a touch operation in a region equal to the display screen, the sensor units according to the present invention need to be arranged at the corners of the display screen. Thus, arranging the sensor bars 1 at left and right portions on the display screen can suppress the lengths of the sensor bars 1, compared to arranging them at upper and lower portions.

One purpose of the coordinate input apparatus according to the present invention is to carry it to a meeting room or the like of the user's choice, and quickly use it by using a whiteboard already installed in the meeting room or the wall surface of the meeting room. For this purpose, the sensor bars 1 are made compact and lightweight and attached at left and right portions at which the lengths of the sensor bars 1 can be suppressed.

The third reason is that left-and-right attachment facilitates installation. In other words, in upper-and-lower attachment, if the display screen becomes large, the user needs to prepare a stepladder or the like and do high-place work to attach the sensor bar 1 on the upper side. Depending on the display size, the upper-and-lower attachment sometimes makes installation difficult.

Figure 12A:
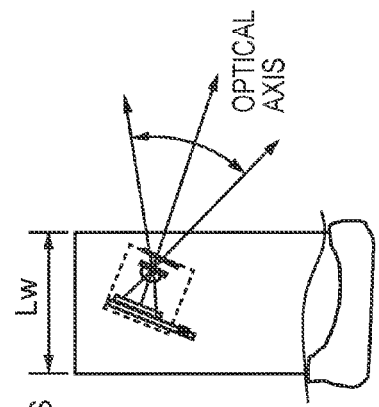
FIG. 12A is a view showing the schematic arrangement of the sensor bar according to the first embodiment.
Figure 12B:
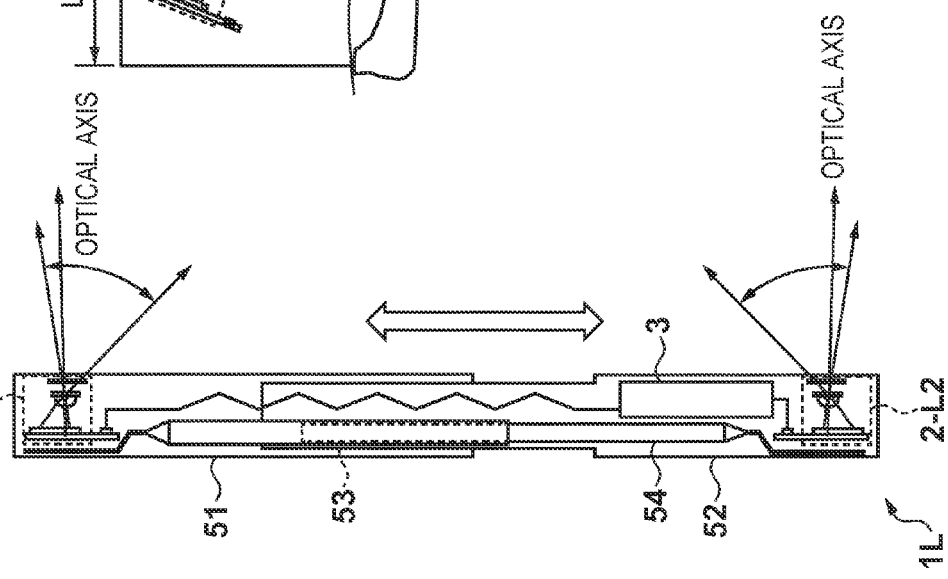
FIG. 12B is a view showing the schematic arrangement of the sensor bar according to the first embodiment.

FIG. 12A shows the schematic arrangement of the sensor bar 1. The sensor bar 1 is formed from an upper housing 51 and lower housing 52. Reference numeral 53 denotes an outer pipe; and 54, an inner pipe. The inner diameter of the outer pipe 53 and the outer diameter of the inner pipe 54 substantially fit with each other. The outer pipe 53 is fixed to the upper housing 51, and the inner pipe 54 is fixed to the lower housing 52. When the length of the sensor bar 1 is increased or decreased by the upper housing 51 and lower housing 52, the outer pipe 53 and inner pipe 54 slide while keeping fitting with each other (see FIG. 12B). In the present invention, these pipes are made of a metal to obtain the stretching/contraction direction and mechanical strength of the sensor bar 1 in the stretching/contraction operation. One end of the metal pipe is drawn and crushed. At this portion, the pipe is mechanically coupled to the housing, and the sensor unit 2 is mounted.

In the present invention, the optical axis of the light receiving unit 40 of the sensor unit 2 is arranged in a direction perpendicular to the stretching/contraction direction of the sensor bar 1. As described above, the field range of the light receiving unit 40 is set to be asymmetric to the optical axis. With this arrangement, the housing of the sensor bar 1 can be formed to be thin. This is because the longitudinal direction of the line CCD 41 and that of a circuit board (not shown) on which the line CCD 41 is mounted coincide with the longitudinal direction of the sensor bar 1, and the line CCD 41 and circuit board are arranged efficiently.

Figure 12C:
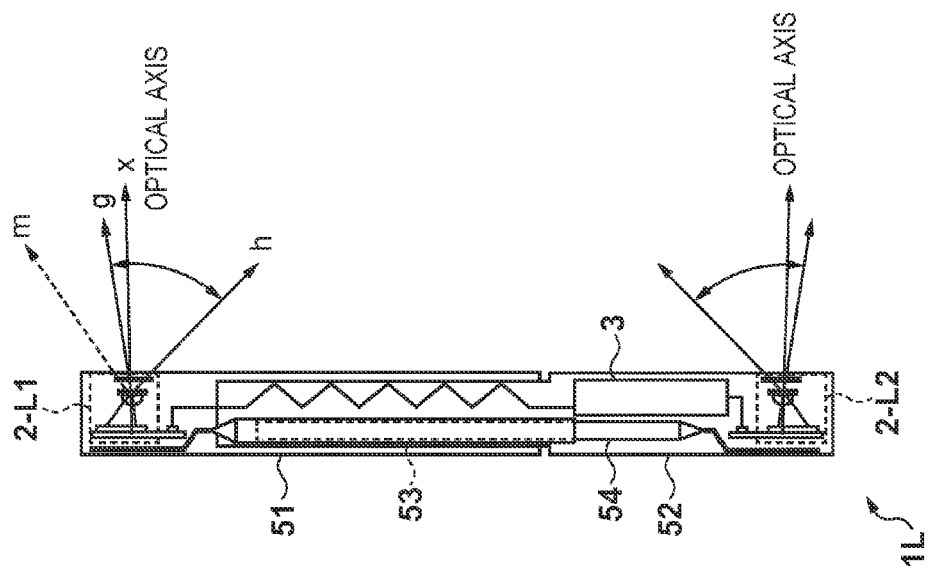
FIG. 12C is a view showing the schematic arrangement of the sensor bar according to the first embodiment.

FIG. 12C exemplifies a light projecting unit which employs a conventional centered optical system. To ensure a field range necessary for the light receiving unit 40, the optical axis of the optical system of the light receiving unit 40 has to be inclined with respect to the sliding direction of the sensor bar. As a result, the width Lw of the sensor bar 1 which stores the optical system becomes larger than the width of the sensor bar 1 in the embodiment of the present invention. This upsizes the housing, increases the weight, impairs portability, and increases the area necessary for mounting the sensor bar. Thus, attaching the sensor bar to a whiteboard or the like reduces the projection area of the display apparatus.

A case in which a centered optical system is used, the optical system of the light receiving unit 40 is set in a direction perpendicular to the sliding direction of the sensor bar 1, and the optical system deflects a beam to ensure a necessary field range in FIG. 12C will be examined. Since new optical elements such as a mirror are inserted in the optical path, the sensor unit 2 inevitably becomes large. Even in this arrangement, the width Lw of the sensor bar 1 increases, compared to the use of a decentered optical system in the present invention.

Further, a case in which a field range of ±50° centered on the optical system (for example, optical axis) of the light receiving unit 40 having a sufficiently large field range is employed will be examined. In FIG. 11A, the field range of the light receiving optical system is a range of the direction h to the direction m, and has an angle Xoh=angle Xom=50° with respect to the optical axis direction X. A field range necessary for the coordinate input apparatus according to the present invention is only a range (range of the direction f to the direction j) which covers the entire region of the retroreflecting member 4 arranged on a facing side. For this reason, almost the half field range on one side (range of the direction j to the direction m) becomes an ineffective region. Even in this case, the effective field range of the light receiving unit 40 is equal to a field range obtained when a substantially decentered optical system is adopted.

Figure 13A:
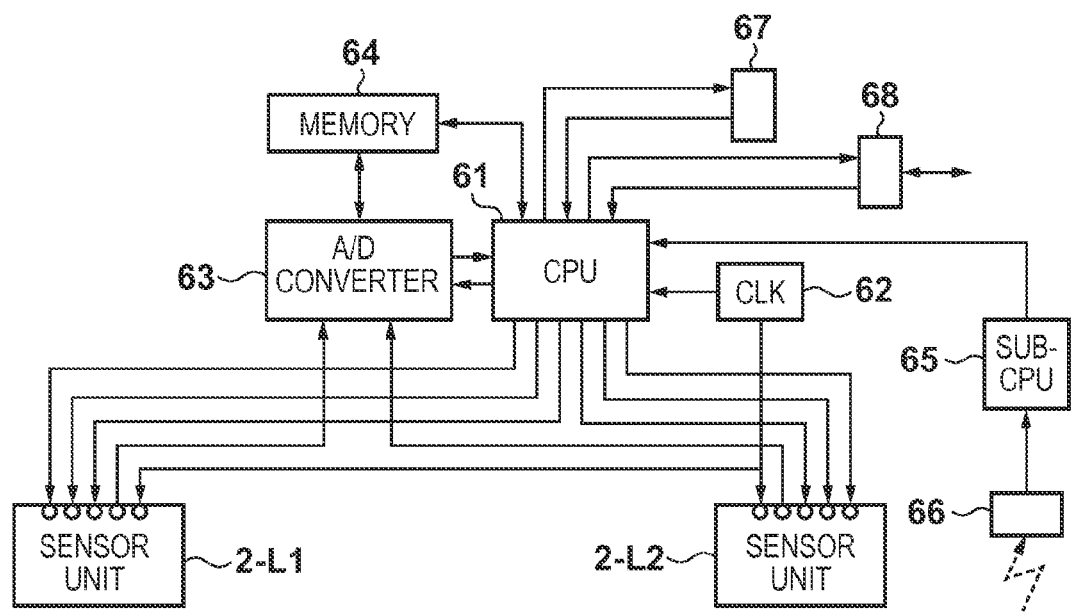
FIG. 13A is a block diagram for explaining the operation of an arithmetic control circuit in the first detection mode according to the first embodiment.

FIG. 13A is a block diagram showing the arithmetic control circuit 3. The arithmetic control circuit 3L of the sensor bar 1L and the arithmetic control circuit 3R of the sensor bar 1R in the embodiment have the same circuit arrangement except for an external interface specification, and perform control of the corresponding connected sensor units 2 and arithmetic processing. FIG. 13A particularly shows the arrangement of the arithmetic control circuit 3L of the sensor bar 1L.

A CPU 61 formed from a one-chip microcomputer or the like outputs CCD control signals for the line CCDs 41 of the sensor units 2-L1 and 2-L2, and performs control of the shutter timings and data output of the line CCDs 41, and the like. CCD clocks are transmitted from a clock generator CLK 62 to the sensor units 2-L1 and 2-L2, and also input to the CPU 61 in order to perform various control operations in synchronism with the line CCDs 41. Note that the CPU 61 supplies LED driving signals for driving the infrared LEDs 31 of the sensor units 2-L1 and 2-L2.

An A/D converter 63 receives detection signals from the line CCDs 41 of the sensor units 2-L1 and 2-L2, and converts them into digital values under the control of the CPU 61. A memory 64 stores the converted digital values to use them for angle calculation. A geometric touch position is calculated from the calculated angle information, and output to an information processing apparatus such as an external PC via an interface 68 (for example, a USB interface).

As described above, the arithmetic control circuit 3 of each sensor bar 1 controls the two sensor units 2. When the arithmetic control circuit 3L of the sensor bar 1L serves as the main function, the CPU 61 transmits a control signal to the arithmetic control circuit 3R of the sensor bar 1R via a serial communication unit 67 to synchronize the circuits. Then, the CPU 61 acquires necessary data from the arithmetic control circuit 3R.

The operation between the arithmetic control circuits 3L and 3R is executed by master-slave control. In the embodiment, the arithmetic control circuit 3L serves as the master, and the arithmetic control circuit 3R serves as the slave. Note that each arithmetic control circuit can become either the master or slave, and a switching unit such as a DIP switch (not shown) can switch the arithmetic control circuit between the master and the slave by inputting a switching signal to the CPU port.

To acquire data from the sensor units 2-R1 and 2-R2 of the sensor bar 1R arranged on a facing side, the arithmetic control circuit 3L of the sensor bar 1L serving as the master transmits a control signal to the arithmetic control circuit 3R serving as the slave via the serial communication unit 67. Angle information obtained by the sensor units 2-R1 and 2-R2 is calculated and transmitted to the arithmetic control circuit 3L serving as the master via the serial communication unit 67.

In the embodiment, the interface 68 is mounted on the arithmetic control circuit 3L serving as the master. An infrared receiving unit 66 is a pointer when a special-purpose pen (not shown) for emitting an infrared ray is used. A sub-CPU 65 decodes a signal from the special-purpose pen. The special-purpose pen includes a switch which detects pressing of the input surface by the pen tip, and various switches arranged on the side of the pen housing. The operation state of the special-purpose pen can be detected by transmitting the states of these switches and pen identification information from an infrared emitting unit arranged in the special-purpose pen.

Figure 13B:
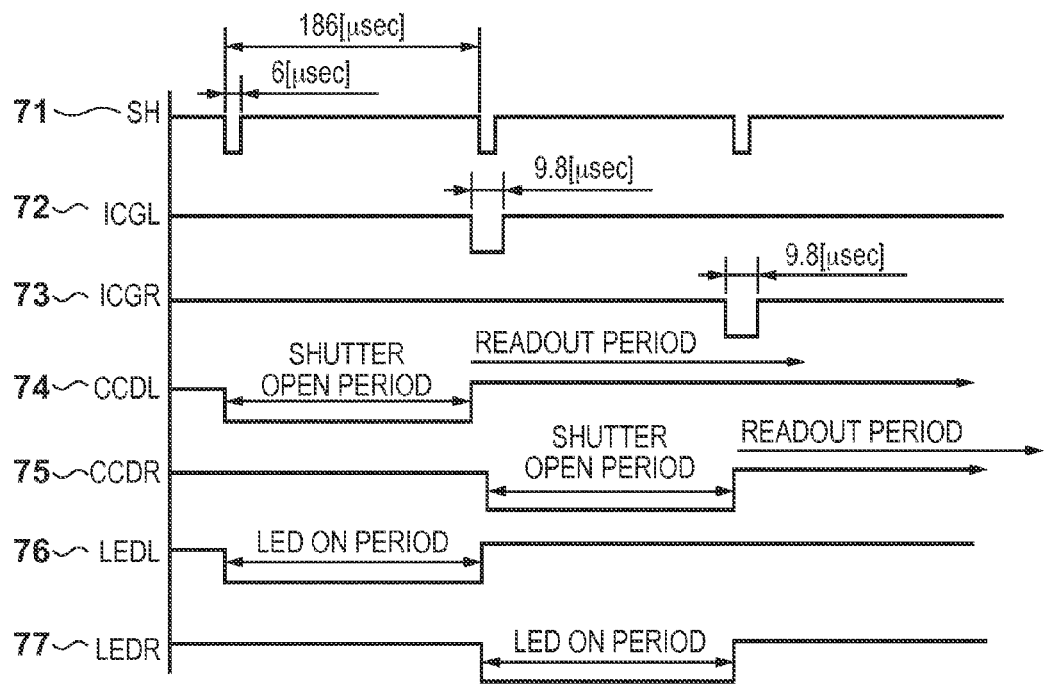
FIG. 13B is a timing chart for explaining the operation of the arithmetic control circuit in the first detection mode according to the first embodiment.

FIG. 13B is a timing chart showing control signals output from the CPU 61 of the arithmetic control circuit 3L serving as the master to operate the sensor unit 2, and the operation of the sensor unit 2.

Reference numerals 71, 72, and 73 denote control signals for controlling the line CCD 41. The interval of the SH signal 71 determines the shutter open time of the line CCD 41. The ICGL signal 72 is a gate signal to the sensor units 2-L1 and 2-L2 of the sensor bar 1L, and is a signal for transferring charges in the photoelectric converter of the line CCD 41 to a readout unit.

A CCDL signal 74 is a signal representing the shutter open time of the line CCDs 41 of the sensor units 2-L1 and 2-L2. The ICGR signal 73 is a gate signal to the sensor units 2-R1 and 2-R2 of the facing sensor bar 1R, and is transmitted to the arithmetic control circuit 3R of the sensor bar 1R via the serial communication unit 67. Then, the arithmetic control circuit 3R generates a signal for transferring charges in the photoelectric converter of the line CCD 41 to the readout unit. A CCDR signal 75 is a signal representing the shutter open time of the line CCDs 41 of the sensor units 2-R1 and 2-R2.

An LEDL signal 76 and LEDR signal 77 are driving signals for the infrared LEDs 31 of the sensor units 2. To turn on the infrared LEDs 31 of the sensor units 2-L1 and 2-L2 of the sensor bar 1L in the first cycle of the SH signal 71, the LEDL signal 76 is supplied to the infrared LEDs 31 via LED driving circuits (not shown).

To turn on the infrared LEDs 31 of the sensor units 2-R1 and 2-R2 of the sensor bar 1R arranged on a facing side in the next cycle of the SH signal 71, the LEDR signal 77 is supplied to the arithmetic control circuit 3R via the serial communication unit 67. Then, the arithmetic control circuit 3R generates a signal to be supplied to the LED driving circuits.

After the end of driving the infrared LED 31 and opening the shutter of the line CCD 41, a signal from the line CCD 41 is read out from the sensor unit 2, and angle information is calculated by a method to be described later. The arithmetic result of the arithmetic control circuit 3R serving as the slave is transmitted to the arithmetic control circuit 3L serving as the master.

By the above-described operation, the sensor units 2-L1 and 2-L2 of the sensor bar 1L and the sensor units 2-R1 and 2-R2 of the facing sensor bar 1R operate at different timings. With this arrangement, only retroreflected light of light emitted by the sensor unit itself can be detected without detecting infrared light of the sensor unit arranged on a facing side.

Figure 14A:
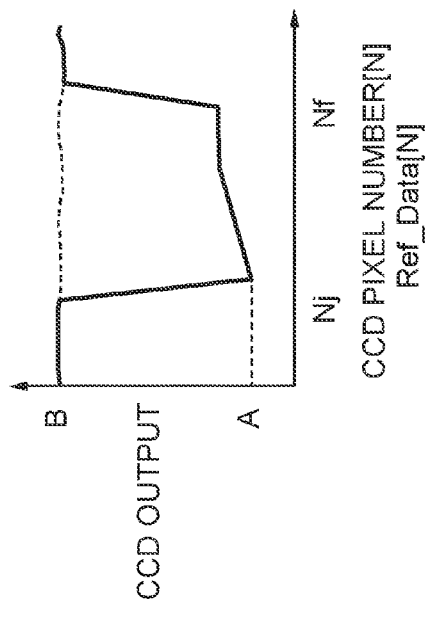
FIG. 14A is a graph for explaining processing of a detection signal waveform according to the first embodiment.
Figure 14B:
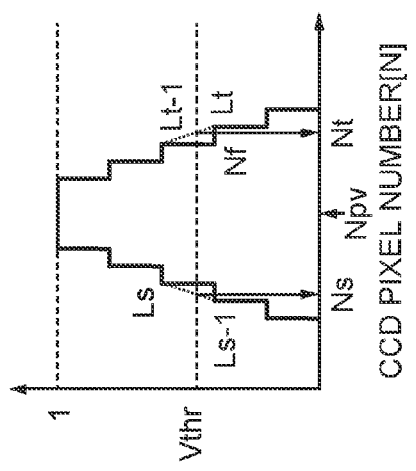
FIG. 14B is a graph for explaining processing of the detection signal waveform according to the first embodiment.

A signal output from the sensor unit 2 of the sensor bar 1 will be explained with reference to FIGS. 14A to 14D. FIG. 14A shows an output from the light receiving unit 40 when the light projecting unit 30 of the sensor unit 2 does not emit light. FIG. 14B shows an output from the light receiving unit 40 when the light projecting unit 30 of the sensor unit 2 emits light. In FIG. 14B, a level A is the maximum level of a detected light amount, and a level B is a level at which no light is detected (received).

An infrared ray emitted by the sensor unit 2 is retroreflected by the retroreflecting member 4 arranged on a facing side, and detected by the sensor unit 2 itself. The direction of a pixel number Nj at which an optical output starts to be obtained is the direction j in FIG. 11A. Similarly, the direction of a pixel number Nf is the direction f in FIG. 11A. The light amount from the pixel number Nj to the pixel number Nf changes depending on the size and aspect ratio of the display screen, a corresponding arrangement state (especially the distance between the two sensor bars 1) and stretching/contraction state of the sensor bar 1, and the like.

To obtain an optimum light amount level, the coordinate input apparatus according to the present invention controls the SH signal to adjust the shutter open time of the line CCD 41 and the exposure time of the infrared LED 31. The time can be set to be short if a light amount obtained from the sensor unit 2 is large, and long if it is small. Further, a current to be supplied to the infrared LED 31 may be adjusted depending on a detected light amount level. The coordinate input apparatus is configured to obtain an optimum light amount by monitoring an output signal in this manner. This adjustment may be performed, as needed, when the level varies. Alternatively, when the sensor bar 1 is set and holds the state, the light amount may be adjusted upon power-on after the completion of installation because a stable predetermined signal should be obtained.

Referring back to FIGS. 14A to 14D, when the user touches the input surface of the effective coordinate input region 5 and cuts off the optical path, no light amount can be detected at, for example, the pixel number Nc, as shown in FIG. 14C. In the present invention, a direction in which the input surface has been touched, that is, an angle is calculated using signals in FIGS. 14A to 14C.

First, reference data is acquired upon activation of the system, upon reset of the system, or automatically. Although data processing of one sensor unit 2 will be explained below, the remaining sensor units also perform the same processing.

Upon power-on, while the operator does not perform a touch operation and the illumination by the light projecting unit 30 is OFF, the A/D converter 63 A/D-converts an output from the line CCD 41, and the memory 64 stores the value as Base_Data[N]. This data contains variations of the bias of the line CCD 41 and is data around the level B in FIG. 14A. [N] is the CCD pixel number of the line CCD 41, and a pixel number corresponding to the effective input range is used.

Similarly, a light amount distribution in a state in which the operator does not perform a touch operation and the illumination by the light projecting unit 30 is ON is acquired and stored. This data is data indicated by a solid line in FIG. 14B, and is stored as Ref_Data[N] in the memory 64. The storage of these two types of data are managed as initial data.

After that, sampling starts. If no touch operation is performed, the data shown in FIG. 14B is obtained. If a touch operation is performed, data shown in FIG. 14C in which a shadow C has been detected in accordance with the touch position is detected. The sample data obtained when the illumination by the light projecting unit 30 is ON is defined as Norm_Data[N].

By using these data (Base_Data[N] and Ref_Data[N] stored in the memory 64), the presence/absence of an input from the pointer and the presence/absence of a light shielding portion are determined. First, to specify a light shielding portion, the absolute amount of a change of data is calculated in each pixel and compared with a preset threshold Vtha:

$$\text{Norm\_Data0}[N] = \text{Norm\_Data}[N] - \text{Ref\_Data}[N] \tag{1}$$

where Norm_Data0[N] is the absolute change amount in each pixel. By comparison with the threshold, a determination error caused by noise or the like is prevented, and a reliable change of a predetermined amount is detected. If data exceeding the threshold is generated in, for example, a predetermined number or more of successive pixels, it is determined that a touch operation has been performed. Since this processing only calculates a difference and compares it, the calculation can be executed within a short time and the presence/absence of an input can be determined quickly.

Then, for higher-accuracy detection, the change ratio of pixel data is calculated, and an input point is determined using equation (2):

$$\text{Norm\_Data}R[N] = \text{Norm\_Data0}[N] / (\text{Base\_Data}[N] - \text{Ref\_Data}[N]) \tag{2}$$

For this pixel data (light amount distribution), a separately set threshold Vthr is applied. Then, the angle is calculated by obtaining, as a pixel corresponding to the input from the pointer, the center between pixel numbers at the leading edge and trailing edge of a light amount variation region corresponding to the light shielding portion in the light amount distribution, which correspond to points crossing the threshold Vthr.

Figure 14C:
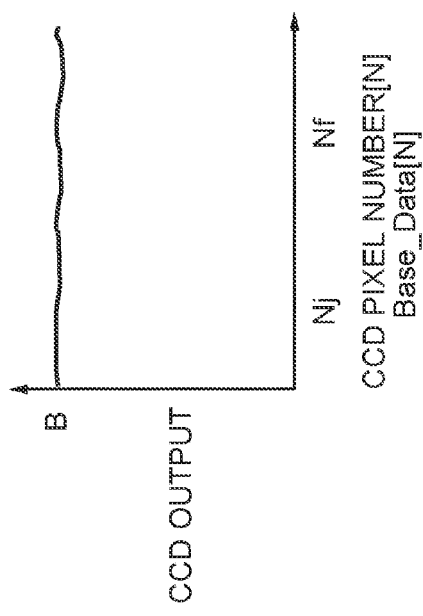
FIG. 14C is a graph for explaining processing of the detection signal waveform according to the first embodiment.
Figure 14D:
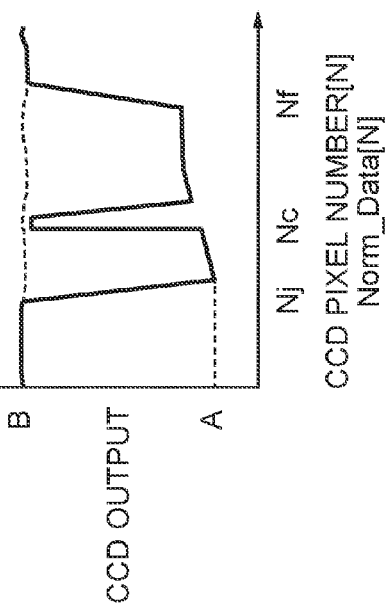
FIG. 14D is a graph for explaining processing of the detection signal waveform according to the first embodiment.

FIG. 14D exemplifies a detection result after the end of calculating the change ratio. Assume that the threshold Vthr is used for detection, and the leading edge of the light shielding portion reaches a level Ls in the Ns-th pixel and exceeds the threshold Vthr. Further, assume that the pixel data reaches a level Lt in the Nt-th pixel and becomes lower than the threshold Vthr.

At this time, calculation may be performed by setting, as the center value between pixel numbers at the leading edge and the trailing edge, the pixel number Np of the line CCD 41 that should be output, as represented by equation (3):

$$Np=Ns+(Nt-Ns)/2 \quad (3)$$

In this case, the pixel interval of the line CCD 41 serves as the resolution of the output pixel number.

For higher-resolution detection, a virtual pixel number at which the threshold Vthr is crossed is calculated using the data level of each pixel and that of an immediately preceding adjacent pixel.

Letting Ls be the level of the pixel Ns, Ls-1 be that of the pixel Ns-1, Lt be that of the pixel Nt, and Lt-1 be that of the pixel Nt-1, virtual pixel numbers Nsv and Ntv can be calculated as $$Nsv=Ns-1+(Vthr-Ls-1)/(Ls-Ls-1) \quad (4)$$

$$Ntv=Nt-1+(Vthr-Lt-1)/(Lt-Lt-1) \quad (5)$$

According to these calculation equations, virtual pixel numbers corresponding to the output level, that is, pixel numbers finer than those of the line CCD 41 can be acquired. A virtual center pixel Npv between the virtual pixel numbers Nsv and Ntv is determined by equation (6):

$$Npv=Nsv+(Ntv-Nsv)/2 \quad (6)$$

In this fashion, higher-resolution detection can be implemented by calculating virtual pixel numbers crossing the threshold Vthr of the predetermined level from the pixel numbers of pixels of data levels crossing the threshold Vthr, adjacent pixel numbers, and their data levels.

To calculate the actual coordinate value of the pointer from the thus-obtained center pixel number, the center pixel number needs to be converted into angle information.

In actual coordinate calculation to be described later, it is more convenient to calculate not an angle itself but a tangent value at this angle. Note that a pixel number is converted into tan θ by looking up a table or using a transformation. When a high-order polynomial is used as the transformation, the accuracy can be ensured. However, it suffices to determine the order and the like in consideration of the calculation ability, accuracy, and the like.

The use of a fifth-order polynomial will be exemplified. When the fifth-order polynomial is used, six coefficients are necessary, and these coefficient data are stored in a memory such as a nonvolatile memory in shipment or the like. Letting L5, L4, L3, L2, L1, and L0 be the coefficients of the fifth-order polynomial, tan θ can be expressed by $$\tan θ=((((L5*Npr+L4)*Npr+L3)*Npr+L2)*Npr+L1)\\*Npr+L0 \quad (7)$$

By executing the same processing for the respective sensor units, respective angle data can be determined. Although tan θ is calculated in the above example, angle data itself may be calculated and then tan θ may be calculated.

Figure 15A:
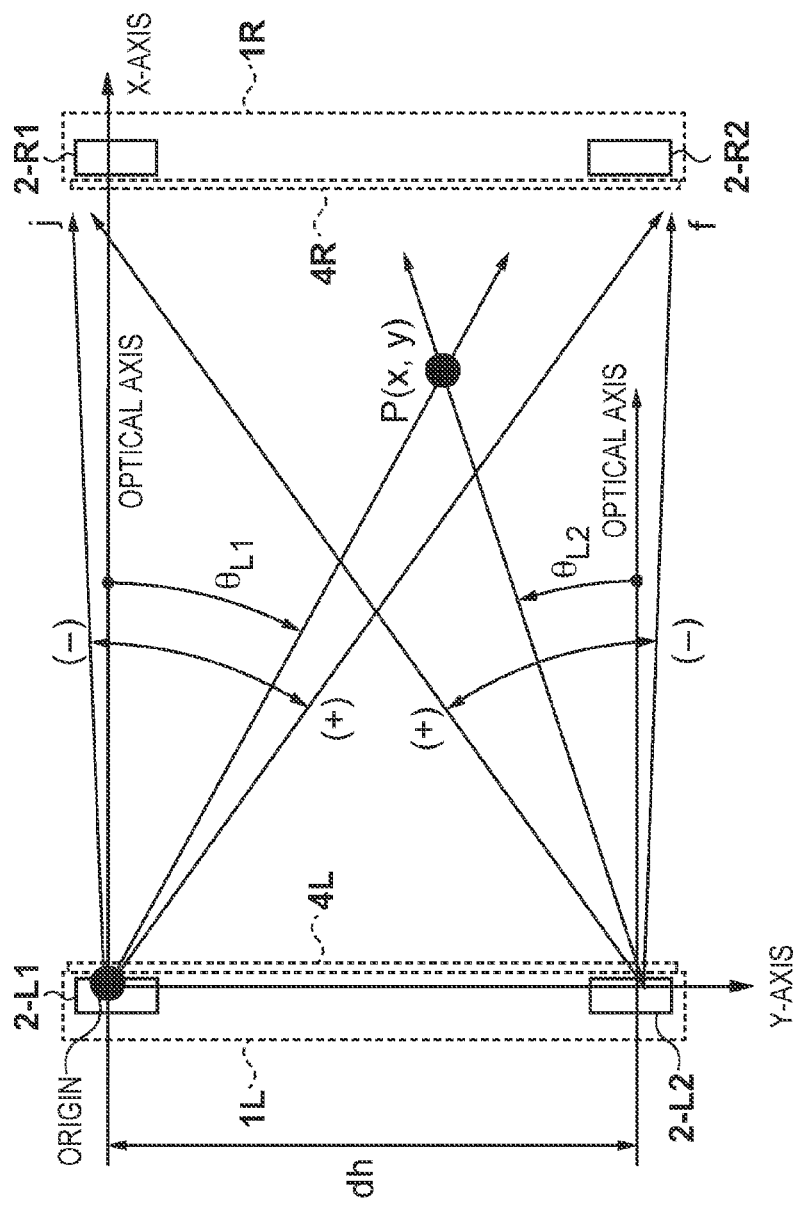
FIG. 15A is a view for explaining coordinate calculation according to the first embodiment.

FIGS. 15A to 15F are views showing a positional relationship with screen coordinates. The field range of the sensor unit 2-L1 of the sensor bar 1L is a range of the direction j to the direction f, and the sign of the angle is set as shown in FIG. 15A. The optical axis of the sensor unit 2-L1 is the X-axis direction, and its direction is defined as an angle of 0°. Similarly, the field range of the sensor unit 2-L2 is a range of the direction f to the direction j, the sign of the angle is set as shown in FIG. 15A, and the optical axis direction of the sensor unit 2-L2 is defined as an angle of 0°. A line segment connecting the center of the optical axis of the sensor unit 2-L1 and that of the optical axis of the sensor unit 2-L2 is defined as the Y-axis. Then, the optical axis of each sensor unit serves as the normal direction of the line segment. Also, the distance between the center of the optical axis of the sensor unit 2-L1 and that of the optical axis of the sensor unit 2-L2 is defined as dh.

Assume that a touch operation is performed at the position of a point P.

An angle calculated by the sensor unit 2-L1 is θL1, and an angle calculated by the sensor unit 2-L2 is θL2. The coordinates of the touch position P can be geometrically calculated using these two pieces of angle information and the distance dh:

$$x=dh·\tan(Π/2-θL2)·\tan(Π/2-θL1)/(\tan(Π/2-θL2)+\tan(Π2-θL1)) \quad (8)$$

$$y=dh·\tan(Π/2-θL2)·\tan(Π/2-θL2)/(\tan(Π/2-θL1) \quad (9)$$

Even if an output from one sensor unit is θL1=0 or θL2=0, the touch position can be geometrically easily calculated based on angle information output from the other sensor unit.

The touch position can be calculated only when the touch position P exists in a hatched range in FIG. 15B out of the field ranges of the sensor units 2-L1 and 2-L2. When no touch position exists in this range, a touch position in the entire effective coordinate input region 5 can be detected by changing a combination of sensor units used for calculation, as shown in FIGS. 15C, 15D, and 15E. Therefore, sensor units necessary for coordinate calculation are selected based on the presence/absence of a light shielding direction detected by each sensor unit 2 and the light shielding direction, and the touch position is calculated. Then, the parameters in equations (8) and (9) are changed in accordance with a combination of the selected sensor units 2, and coordinate transformation is performed.

As shown in FIG. 15F, the touch position P may exist near a sensor unit selection boundary region. In this case, the touch position can be calculated by a combination of sensor units in the state of FIG. 15B or 15C. As a detailed arrangement, for example, the field range of the sensor unit 2-L2 and that of the sensor unit 2-R1 overlap each other in the diagonal direction of the effective coordinate input region 5. When the user touches the overlapping region, coordinates can be calculated by a plurality of sensor unit combinations. In this case, the average value of coordinate values calculated by a combination of sensor units may be output as determined coordinates.

Figure 16:
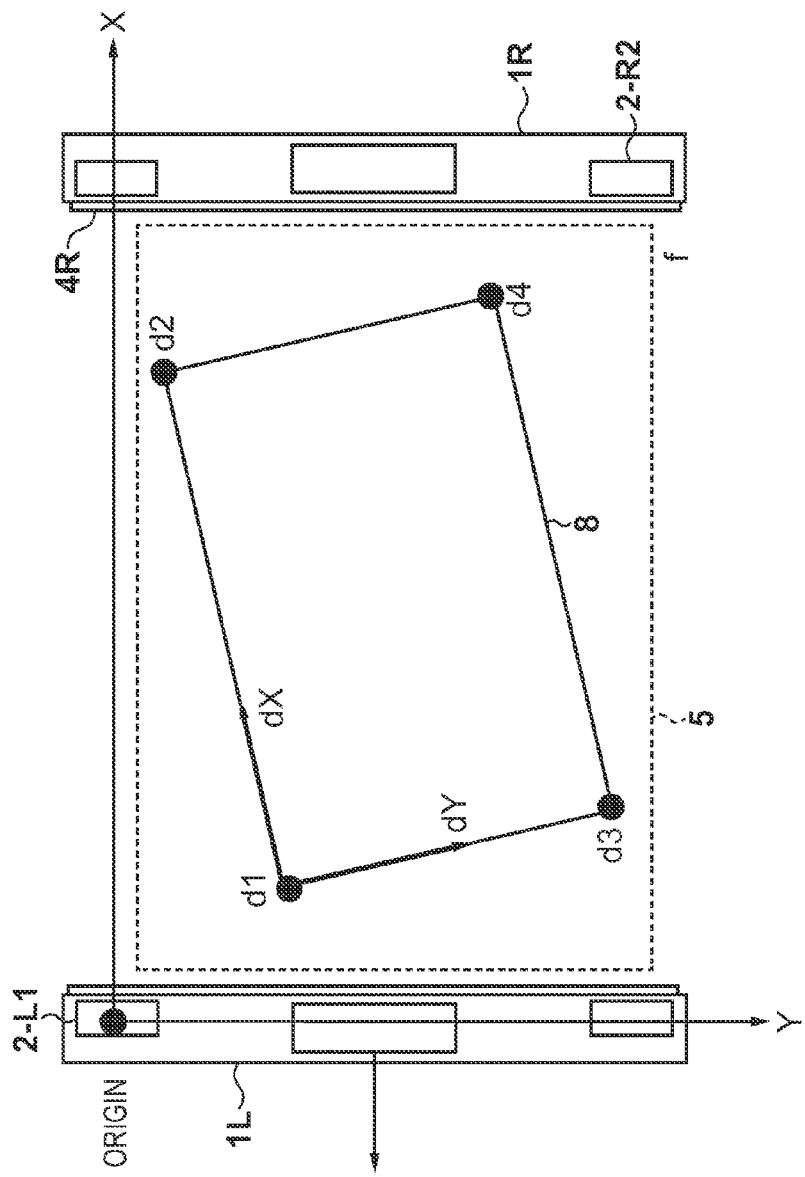
FIG. 16 is a view for explaining a digitizer coordinate system and screen coordinate system according to the first embodiment.

The thus-calculated coordinate value is the value of the first coordinate system (to be referred to as a digitizer coordinate system hereinafter) of the coordinate input apparatus according to the present invention, and the effective region where position calculation is possible is the effective coordinate input region 5 in FIG. 11A. The display surface of the display is set within the range of the effective coordinate input region 5. If the display is a front projector, a display region 8 serving as a projected image is set in the effective coordinate input region 5, as shown in FIG. 16. In FIG. 16, the display region has the second coordinate system (to be referred to as a screen coordinate system hereinafter) serving as a display coordinate system which has an origin d1 and is defined by the dX axis and dY axis. To perform a tap operation for an icon or the like by directly touching a displayed image, the digitizer coordinate system and screen coordinate system need to be correlated.

To obtain the correlation, dedicated application software is generally installed in a personal computer (PC) which performs display control. When the application is activated, a cross or the like is displayed on the display screen to prompt the user to touch the cross position. The coordinate system is transformed so that a coordinate value in the digitizer coordinate system that is obtained by repeating this operation at different positions by a predetermined number of times, and a coordinate value in the screen coordinate system at the position where the cross is displayed coincide with each other.

The coordinate input apparatus according to the present invention performs this coordinate transformation by prompting the user to touch the four corners of the display screen, instead of displaying a cross position by using the application software and prompting the user to touch it. This arrangement has a great effect of quickly using the coordinate input apparatus by connecting it to an on-site PC without installing special software. Especially, the coordinate input apparatus according to the present invention is greatly advantageous because it is portable and is installed in a meeting room by carrying the sensor bars 1 without carrying a PC together. The coordinate input apparatus according to the present invention has a great effect of using it immediately upon completion of easy installation using a PC and display apparatus at a place to which the coordinate input apparatus has been carried.

Transition to the mode in which these coordinate systems are made to coincide with each other is performed by, for example, a mode transition switch (not shown) arranged on the sensor bar 1. Upon mode transition by the mode transition switch, an output unit such as a loudspeaker incorporated in the sensor bar 1 gives guidance to sequentially touch the four corners. Every time the corner is touched, a buzzer sound may be output to represent the completion of the input. Alternatively, an indicator incorporated in the sensor bar 1 may prompt the operation.

In coordinate calculation in the digitizer coordinate system, the distance dh between the sensor units 2 used in calculation of equations (8) and (9) needs to be known in advance. However, in a use form as shown in FIG. 16 in which the coordinate input apparatus is used in combination with the display apparatus, the distance dh need not always be known in advance. More specifically, information about the four corners representing a display size is sequentially acquired as angle information in each sensor unit in the digitizer coordinate system by a touch operation. As a result, the coordinates of a touch position in the screen coordinate system can be calculated by only ratio-based calculation.

The coordinate input apparatus according to the present invention assumes that the user attaches the two sensor bars 1 to display screens of various display sizes. After the two sensor bars have a relative positional relationship in FIG. 15A (the two sensor bars are parallel and have the same length, and the sensor unit of the other sensor bar is arranged in the X-axis direction), high-accuracy position detection in the digitizer coordinate system becomes possible. Although a mechanism which sets the two sensor bars 1 in this arrangement may be adopted, the user is forced to do careful installation work. If the user can easily attach the two sensor bars at a rough estimate, this improves convenience and greatly shortens the installation time. For higher convenience, therefore, the present invention employs the second detection mode as a coordinate detection mode.

Figure 17A:
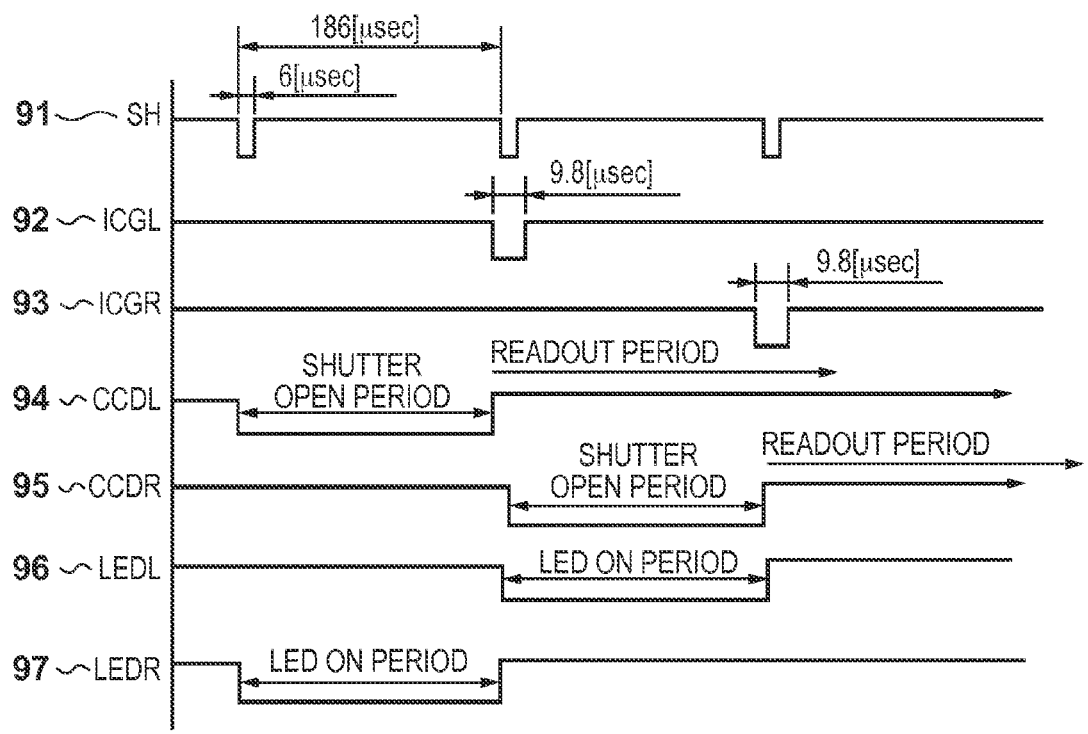
FIG. 17A is a timing chart for explaining the operation of the arithmetic control circuit in the second detection mode according to the first embodiment.

FIG. 17A is a timing chart showing control signals output from the CPU 61 of the sensor bar 1L serving as the master, and the operation of the sensor unit 2 in order to explain the second detection mode.

Reference numerals 91, 92, and 93 denote control signals for controlling the line CCD 41. The interval of the SH signal 91 determines the shutter open time of the line CCD 41. The ICGL signal 92 is a gate signal to the sensor units 2-L1 and 2-L2 of the sensor bar 1L, and is a signal for transferring charges in the photoelectric converter of the line CCD 41 to a readout unit.

A CCDL signal 94 is a signal representing the shutter open time of the line CCDs 41 of the sensor units 2-L1 and 2-L2. The ICGR signal 93 is a gate signal to the sensor units 2-R1 and 2-R2 of the facing sensor bar 1R, and is transmitted to the arithmetic control circuit 3R of the sensor bar 1R via the serial communication unit 67. Then, the arithmetic control circuit 3R generates a signal for transferring charges in the photoelectric converter of the line CCD 41 to the readout unit. A CCDR signal 95 is a signal representing the shutter open time of the line CCDs 41 of the sensor units 2-R1 and 2-R2.

An LEDL signal 96 and LEDR signal 97 are driving signals for the infrared LEDs 31 of the sensor units 2. To turn on the infrared LEDs 31 of the sensor units 2-R1 and 2-R2 of the sensor bar 1R in the first cycle of the SH signal 91, the LEDR signal 97 is transmitted to the arithmetic control circuit 3R of the sensor bar 1R via the serial communication unit 67. Then, the arithmetic control circuit 3R generates a signal to be supplied to the LED driving circuits.

To turn on the infrared LEDs 31 of the sensor units 2-L1 and 2-L2 of the sensor bar 1L in the next cycle of the SH signal 91, the LEDL signal 96 is supplied to the infrared LEDs 31 via the LED driving circuits.

After the end of driving the infrared LED 31 and opening the shutter of the line CCD 41, a signal from the line CCD 41 is read out from the sensor unit 2, and angle information is calculated by a method to be described later. The arithmetic result of the arithmetic control circuit 3R serving as the slave is transmitted to the arithmetic control circuit 3L serving as the master.

By the above-described operation, the sensor units 2-L1 and 2-L2 of the sensor bar 1L directly detect infrared light emitted by the infrared LEDs 31 of the sensor units 2-R1 and 2-R2 of the facing sensor bar 1R. Similarly, the sensor units 2-R1 and 2-R2 of the sensor bar 1R directly detect infrared light emitted by the infrared LEDs 31 of the sensor units 2-L1 and 2-L2 of the facing sensor bar 1L.

Note that FIG. 13B shows a coordinate detection mode in which the sensor units 2-L1 and 2-L2 of the sensor bar 1L and the sensor units 2-R1 and 2-R2 of the facing sensor bar 1R operate at different timings. This coordinate detection mode is the first detection mode.

Figure 17B:
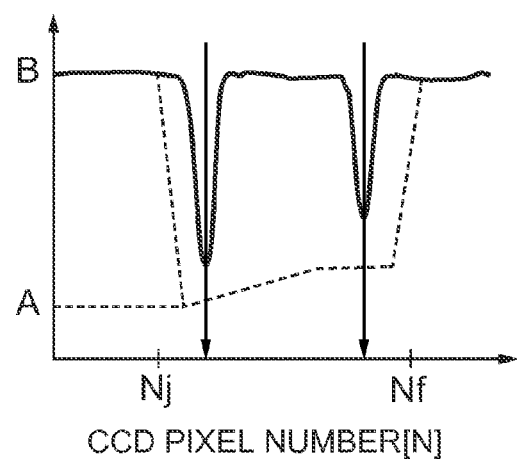
FIG. 17B is a graph for explaining the operation of the arithmetic control circuit in the second detection mode according to the first embodiment.

FIG. 17B shows a detection signal waveform obtained by the sensor unit 2 when the coordinate input apparatus operates in the second detection mode. Beams emitted by the light projecting units 30 of the two sensor units 2 arranged on facing sides are received, so two peak signals are generated. The respective directions are calculated by the same method as the above-described angle calculation method. In FIG. 17B, a broken line indicates an output (light amount distribution) from the light receiving unit 40 shown in FIG. 14B, and represents that peak signals are generated between the direction Nj and the direction Nf.

One purpose of the present invention is to implement high-accuracy position detection even when the user attaches the two sensor bars 1 at a rough estimate, as described above. To achieve this, each sensor unit 2 detects light from the light projecting unit 30 of the sensor unit 2 stored in the facing sensor bar 1, thereby detecting a direction in which the facing sensor unit 2 is positioned.

This state will be explained with reference to FIG. 18.

Figure 18:
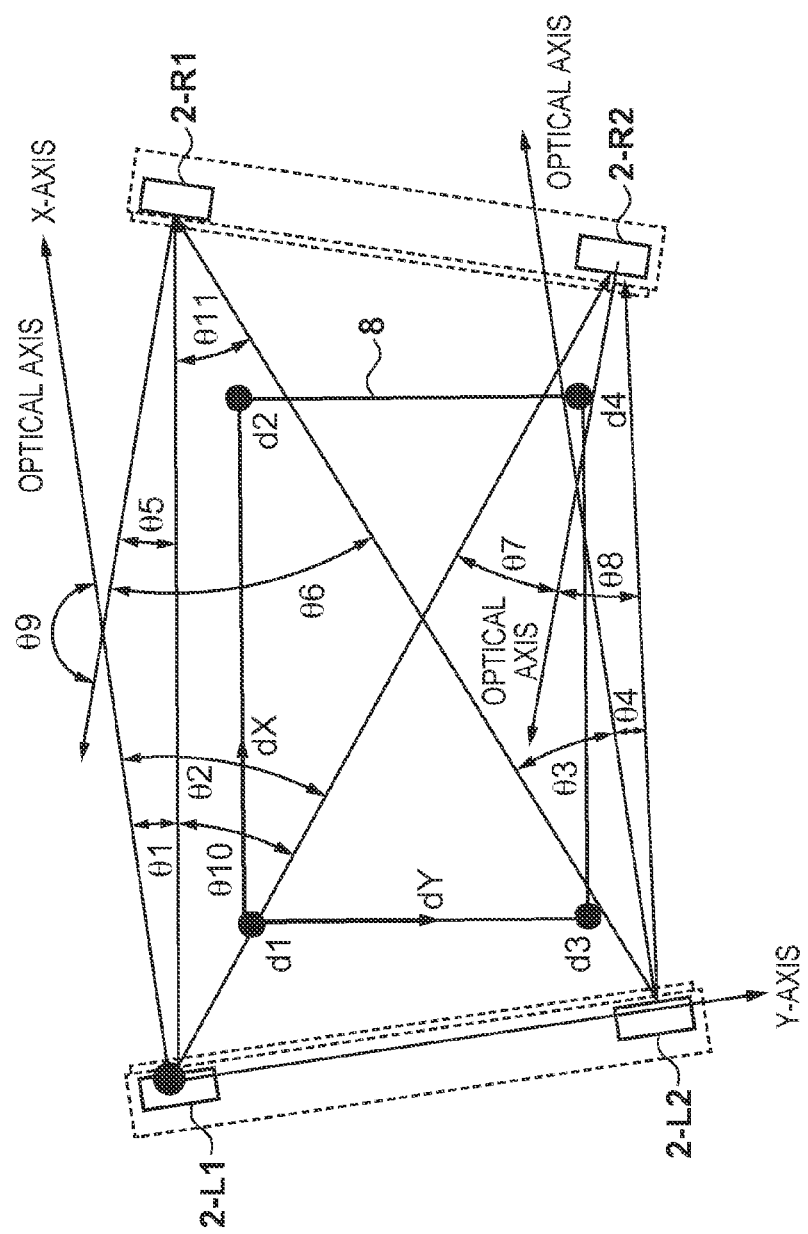
FIG. 18 is a view for explaining calculation of the relative positional relationship between the sensor units according to the first embodiment.

In FIG. 18, a line segment connecting the center of the optical axis of the sensor unit 2-L1 and that of the optical axis of the sensor unit 2-L2 is defined as the Y-axis, and the normal direction is defined as the X-axis. The optical axes of the sensor units 2-L1 and 2-L2 are parallel to the X-axis. The facing sensor unit 2-R1 is positioned in a direction at an angle θ1 when viewed from the sensor unit 2-L1, and a direction at an angle θ3 when viewed from the sensor unit 2-L2. Similarly, angles from θ1 to θ8 can be calculated. As a result, an angle θ9 formed by the optical axis of the sensor unit 2-L1 of the sensor bar 1L and that of the sensor unit 2-R1 of the sensor bar 1R is calculated.

In other words, the relative inclinations of the sensor bars 1L and 1R can be detected. Further, even when the length of the sensor bar 1 in the longitudinal direction changes upon stretching/contraction, the relative positional relationship between the four sensor units can be acquired though the absolute distance between the sensor units 2 cannot be obtained. If the above-mentioned information about four corners representing a display size is acquired by a touch operation, coordinates in the screen coordinate system can be calculated at high accuracy by only ratio-based calculation.

FIG. 19 is a flowchart showing initial setting processing after power-on.

To form the rectangular effective coordinate input region 5 containing the entire display region 8 serving as a projected image, when the operator attaches the sensor bars 1 to the whiteboard 6, for example, the coordinate input apparatus is turned on and initial settings are performed (step S101).

Then, various initial settings regarding the coordinate input apparatus such as port setting of the CPU 61 and timer setting are performed. In addition, the line CCD 41 is also initialized to, for example, remove unwanted charges remaining in the photoelectric converter (step S102). A light amount to be detected by the line CCD 41 is optimized. As described above, the size of the display region 8 changes depending on the size of the whiteboard 6. Even in this case, the user appropriately sets the distance between the sensor bars 1 by stretching/contracting the sensor bars 1. Since the intensity of detected light changes depending on the attaching state, operation settings are made in the second detection mode including settings of the shutter open time of the line CCD 41 and the ON time of the infrared LED 31 or the driving current of the infrared LED 31 (step S103). Thereafter, an output signal from the line CCD 41 is received (step S104).

The operation settings in step S103 aim at deriving the relative positional relationship between the four sensor units 2 that is an operation state (the second detection mode in FIGS. 17A and 17B) in which light is directly received from the facing sensor unit 2. If the initial operation settings are made in step S103 to obtain a maximum light amount, the state in which no light has been detected in step S105 means that the sensor unit 2 at a facing position does not exist in the field range of the light receiving unit 40 of the sensor unit 2. That is, the arrangement/setting of the sensor bars 1 by the user is improper. In step S106, the user is notified of a message indicative of this, and prompted to set again the sensor bars. Upon completion of re-setting by the user, step S101 starts again. Note that signals detected in steps S105 and S106 are ones as shown in FIG. 17B. In the embodiment, a state in which two signals are output is a normal state.

After that, the waveform of the detection signal is checked (step S107). If light from the sensor unit 2 at a facing position is excessively strong, for example, if at least part of the waveform (waveform level) of the detection signal exceeds a predetermined threshold (NO in step S107), the process returns to step S103, and settings are made again to, for example, shorten the exposure time. A detection signal waveform checked in step S107 next time should exhibit a lower light intensity. If the signal level is appropriate (YES in step S107), for example, if at least part of the detection signal waveform is equal to or lower than the predetermined threshold, the process advances to step S108. This operation is executed in the respective sensor units (four sensor units in the embodiment). After optimizing all the signals, the relative positional relationship between the sensor units 2 is calculated (step S108).

In step S109 and subsequent steps, infrared light projected by the sensor unit 2 is retroreflected by the retroreflecting member 4 mounted on the facing sensor bar 1, the retroreflected light is detected by the light receiving unit 40 of the sensor unit 2 itself, and the signal level at this time is optimized. As described above, the arrangement of the sensor bars 1 is not constant, and a detection level corresponding to the arrangement is optimized to obtain a stable signal. Operation settings are made in the first detection mode including, as items to be set, settings of the shutter open time of the line CCD 41 and the ON time of the infrared LED 31 or the driving current of the infrared LED 31 (step S109). If the initial operation settings are made in step S109 to obtain a maximum light amount, an output signal from the line CCD 41 at this time is received (step S110).

The received output signal is data in the presence of illumination, and has a waveform as shown in FIG. 14B. If light is excessively strong, it exceeds the dynamic range of the line CCD 41, the output is saturated, and it becomes difficult to calculate an accurate angle. In this case, it is determined in step S111 that the detection signal waveform is improper (NO in step S111), the process returns to step S109, and settings are made again to reduce the detection signal waveform (waveform level). Since retroreflected light is detected, it can be set to greatly increase the amount of light to be projected, compared to a case in which the light receiving unit 40 directly detects light projected by the sensor unit 2 in the processes of steps S103 to S108 (that is, the second detection mode).

If it is determined in step S111 that the waveform level is optimum (YES in step S111), a signal Base_Data[N] (see FIG. 14A) in the absence of illumination is acquired and stored in the memory 64 (step S112). Then, a signal Ref_Data[N] (see FIG. 14B) in the presence of illumination is acquired and stored in the memory 64 (step S113).

After acquiring data in all the sensor units, a series of initial setting processes is completed.

FIG. 20A is a flowchart showing a normal sampling operation after initial setting processing.

The initial setting processing in FIG. 19 is executed (step S101). Then, a signal obtained when infrared light projected by the sensor unit 2 is retroreflected by the retroreflecting member 4 mounted on the facing sensor bar 1 and the retroreflected light is detected by the light receiving unit 40 of the sensor unit 2 itself is detected as a normal reception operation (first detection mode) (step S201). The data at this time is Norm_data[N]. If a touch operation is performed and cuts off the optical path, no optical signal can be detected near the pixel number Nc, as shown in FIG. 14C.

Whether any sensor unit 2 has generated such a light shielding portion, that is, the presence/absence of an input is determined (step S202). If it is determined that there is no input (NO in step S202), the process returns again to step S201 to repeat sampling. If it is determined that there is an input (YES in step S202), sensor units which have generated light shielding portions in the output signal are selected (step S203). By using the selected sensor units, the directions (angles) in which the light shielding portions have been generated are calculated (step S204). Based on the calculated angles, the coordinates of the touch position in the digitizer coordinate system are calculated (step S205). The calculated touch position coordinates are transformed into coordinates in the screen coordinate system, and the coordinate value is output (transmitted) to the external device of a personal computer (step S206).

At this time, a touch-down signal/touch-up signal representing whether the input surface remains touched may be output together. In a coordinate input apparatus of this type, the optical path is completely cut off by touching the touch screen. However, when the touch state is gradually canceled, light passes gradually. Thus, by calculating the degree at which light is cut off, whether the touch screen remains touched, or the touch screen is not touched but the optical path is cut off (the angle can be calculated, and even in this case, the position can be calculated) can be determined by setting a threshold.

The switching unit such as a switch is operated to shift to the calibration mode (second detection mode) in which the digitizer coordinate system and screen coordinate system are made to coincide with each other. A sequence in the calibration mode will be explained with reference to FIG. 20B.

The calibration mode is executed immediately after the sensor bars 1 are attached, or when the display position of the display changes accidentally even upon completion of installation. After the transition to the calibration mode, initial setting processing is performed (step S101). In this case, an optical output is optimized and misalignment of the sensors is corrected on the assumption that the setting state of the sensor bars changes during use.

To prompt the user to perform a touch operation at the four corners of the display region 8, it is determined through steps S201 and S202 whether the user has touched one of these positions. In step S203 and S204, necessary angle information is calculated. Thereafter, the user is notified of the completion of data acquisition (step S301). As this notification, for example, a beep sound may be output to represent the completion.

Then, it is determined whether acquisition of information about all the four corners of the display region 8 is completed (step S302). If the acquisition is not completed (NO in step S302), the process returns to step S201. If the acquisition is completed (YES in step S302), parameters for transformation from the digitizer coordinate system into the screen coordinate system are calculated (step S303). The process then returns to the normal operation. The calculated parameters are used in coordinate transformation in step S206.

As described above, according to the first embodiment, a set of the light projecting unit, light receiving unit, and retroreflecting member is moved in a direction perpendicular to the input surface. By fully using this arrangement, even if the input surface is distorted or convexed, the coordinate input apparatus can be set in a use state.

Since this arrangement can always keep projected light and received light parallel to the input surface, the depth of response to a touch can be made uniform in the entire input surface, providing a comfortable operational environment.

Second Embodiment

Figure 27:
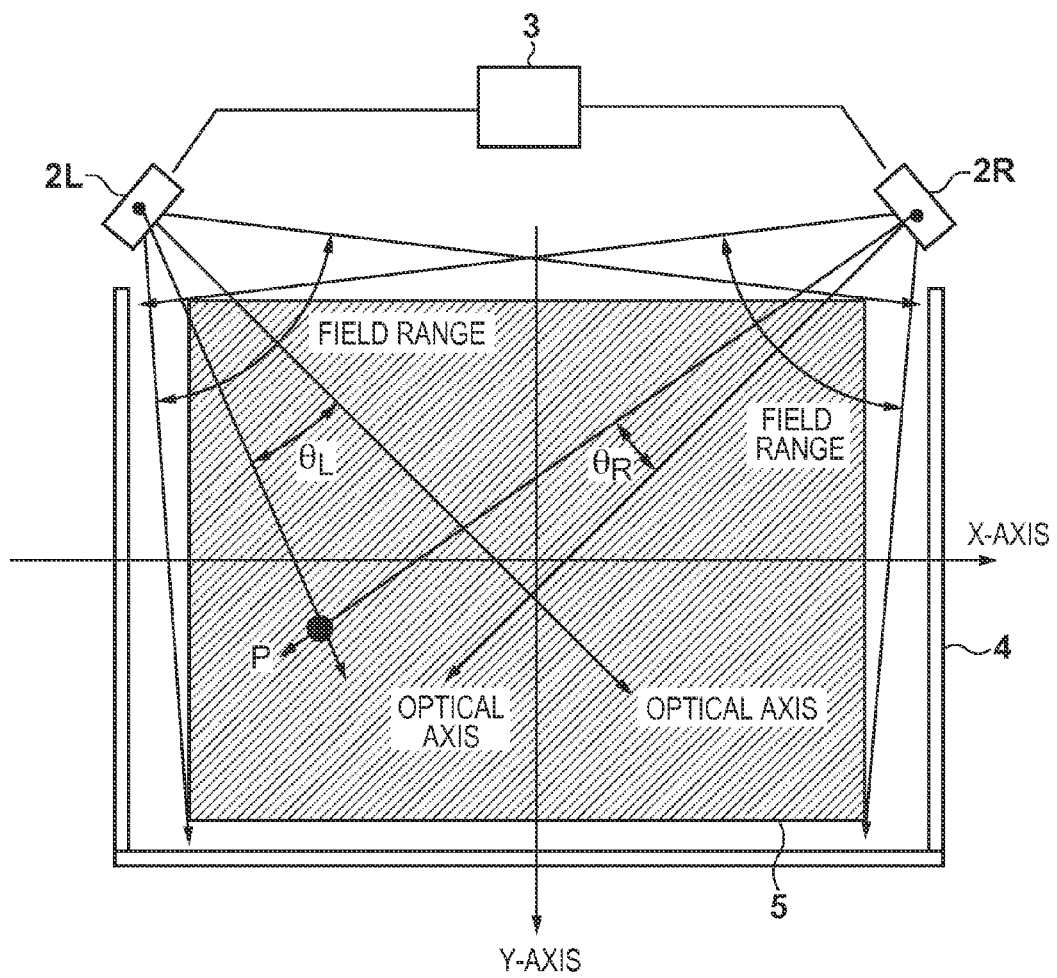
FIG. 27 is a view for explaining the basic arrangement of a conventional optical coordinate input apparatus.

A coordinate input apparatus according to the second embodiment will be described with reference to FIG. 21. The arrangement of the coordinate input apparatus in FIG. 21 is the same as the conventional arrangement shown in FIG. 27. In FIG. 21, a base 108 fixes the coordinate input apparatus including sensor units 2 and retroreflecting members 4. Height adjustment units 106 are arranged on the base 108 and can adjust the height in a direction perpendicular to the input surface. On the base 108, a sensor bar 1 is arranged on one side (long side) of a rectangular region forming an effective coordinate input region 5, and the retroreflecting members 4 are arranged on the remaining three sides, as shown in FIG. 21. By adjusting the height adjustment units 106, similar to the first embodiment, the height of the coordinate input apparatus including the sensor bar 1 and retroreflecting members 4 attached to the base 108 is adjusted in a direction perpendicular to the input surface.

Note that at least three height adjustment units 106 are arranged to support the base 108, and are arranged at positions where they can uniformly adjust the height of the entire base 108.

Third Embodiment

A coordinate input apparatus according to the third embodiment will be described with reference to FIGS. 22A to 22C. In the third embodiment, the coordinate input apparatus is attached to a whiteboard 6 which is curved in the convex shape at a constant curvature in the long side direction, like part of the side surface of a column. Note that the position detection principle and the like are the same as those in the first embodiment, and a description thereof will not be repeated.

The long side direction of the whiteboard 6 is defined as the X direction, the short side direction of the whiteboard 6 is defined as the Y direction, and a direction perpendicular to the coordinate input surface is defined as the Z direction. FIG. 22A is a front view showing the coordinate input apparatus when the whiteboard 6 is viewed from the front. FIG. 22B is a sectional view taken along a line B-B in FIG. 22A, and FIG. 22C is a sectional view taken along a line C-C.

When viewed from the side surface as in FIGS. 22B and 22C, the whiteboard 6 is curved in the convex direction when viewed from the Z direction. The problem arising when sensor bars 1 are set on the curved whiteboard 6 has already been described above. Depending on the position, an input to an effective coordinate input region 5 may be undetectable.

To solve this problem, the setting angles of the sensor bars 1 need to be changed to face straight. In addition, since the whiteboard 6 is curved in the convex direction, if only the angle is changed, the whiteboard 6 eclipses light from a light projecting unit 30, and the height needs to be adjusted. The angle here means an angle between a sensor unit 2 (the barycentric position of the sensor unit 2) and the normal of the effective coordinate input region 5. In the following description, the angle is the angle between the sensor unit 2 and the normal of the effective coordinate input region 5, unless otherwise specified. The X component of the angle will be referred to as an X-Z plane angle, and the Y component of the angle will be referred to as a Y-Z plane angle.

The change angle of the sensor bar 1 depends on the inclination of the setting position, the optical path width of the sensor unit 2, and the size of the coordinate detection region (the distance between sensor bars 1L and 1R). The height adjustment amount depends on the maximum convex amount of the whiteboard 6. It is optimum to perform angle change and height adjustment so as to change the angle by the inclination of the setting position and correct the difference between the setting position of the sensor unit 2 and the height of the whiteboard 6 at the center.

Figure 23:
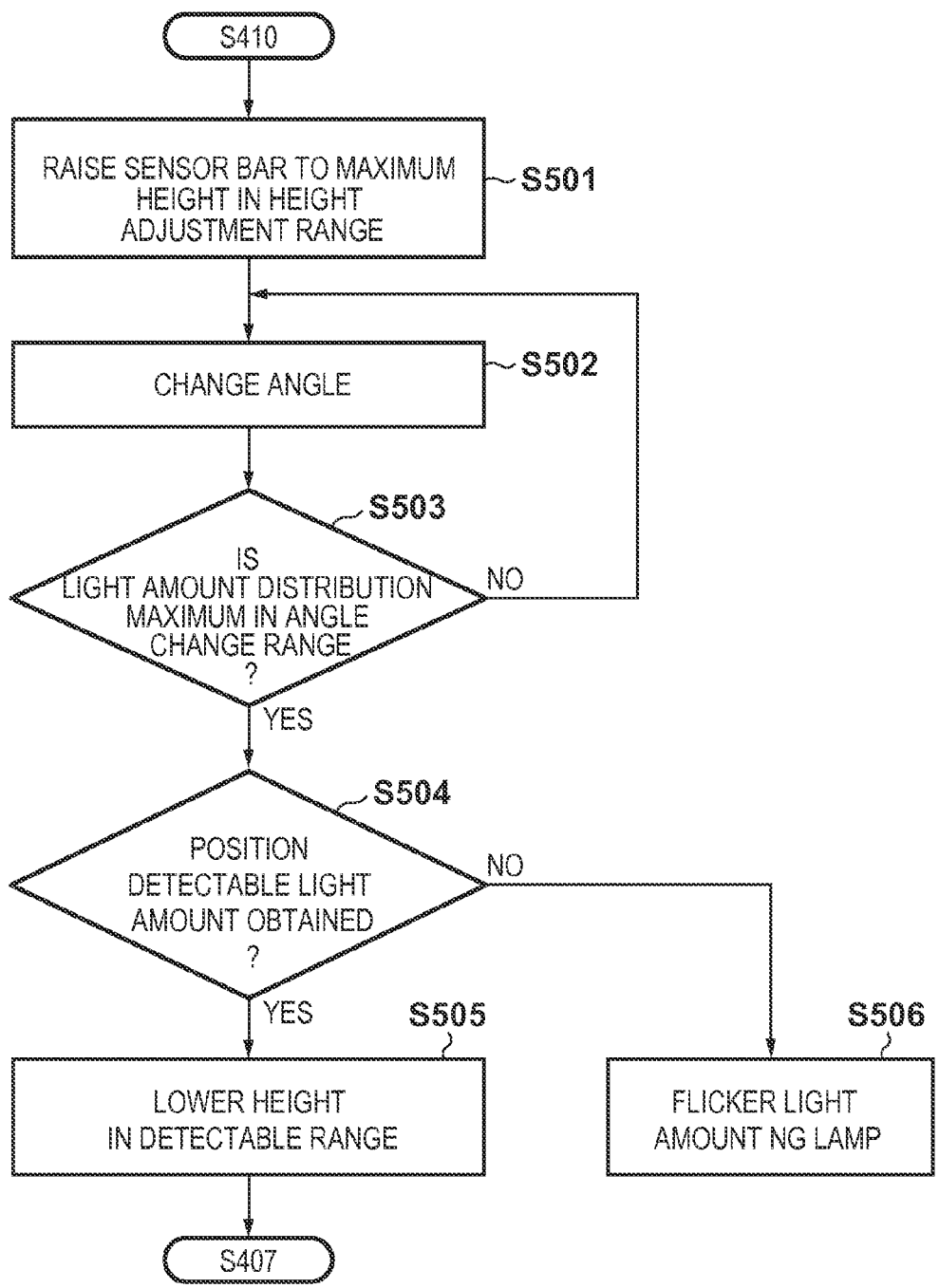
FIG. 23 is a flowchart for determining a change angle and height according to the third embodiment.

Since the whiteboard 6 in the embodiment is curved in the convex shape, sensor bar angle change/height adjustment determination processing when the sensor bars 1 are set on the whiteboard 6 will be explained with reference to FIG. 23.

Although light amount distributions which can be obtained by light receiving units 40 arranged in the four sensor units 2 need to be confirmed in the processing, processing for only one sensor unit 2 will be described. This processing is an alternative to processing in steps S411 to S416 in the flowchart of FIG. 7 according to the first embodiment.

When the sensor bars 1L and 1R are set on the convex whiteboard 6, the left and right sensor bars 1L and 1R do not face straight because they are set along the whiteboard 6. Beams emitted by the light projecting units 30 of the sensor bars 1L and 1R deviate from retroreflecting members 4R and 4L attached to the facing sensor bars 1R and 1L and cannot be received by the light receiving units 40. For this reason, a light amount NG lamp is turned on and off in steps S409 and S410 of FIG. 7.

First, height adjustment units 106 adjust the sensor bars 1 to a maximum height within the height adjustment range (step S501) in order to raise the sensor bars 1 to a position where the light projecting units 30 are located at a level higher than the maximum convex portion of the whiteboard 6 by the height adjustment units 106 because light is eclipsed by the surface of the whiteboard 6 even if the angle is changed.

Then, the left and right sensor bars 1L and 1R are made to face straight by using angle changing units 107 (107-L and 107-R in FIG. 22B) (step S502). The angles are changed so that projected beams hit the retroreflecting members 4L and 4R of the facing sensor bars 1L and 1R. It is determined whether the light amount distribution is maximum in the angle change range (step S503). If the light amount distribution is not maximum (NO in step S503), the angles are changed again (step S502). If the light amount distribution is maximum, the process advances to step S504.

It is determined whether an input to the position detection region with a light amount distribution determined to be maximum in the angle change range is detectable (step S504). If an input is undetectable in even part of the region (NO in step S504), the light amount NG lamp is flickered to notify the user that the coordinate input apparatus cannot be satisfactorily used (step S506). If it is determined in step S504 that even one of the four sensor units 2 is short of the light amount, the process advances to step S506. Needless to say, the present invention is not limited to flickering the light amount NG lamp, and a display unit dedicated to represent that the coordinate input apparatus is unusable may be separately arranged. In this case, the height has already been adjusted to a maximum value in step S501, and no sufficient light amount can be obtained even by lowering the height. It is therefore necessary to change the setting positions of the sensor bars 1 or replace the whiteboard 6.

If an input is detectable (YES in step S504), the heights of the sensor bars 1 are lowered within the detectable range by using the height adjustment units 106. This is because, if the sensor bars 1 are at high level, the distance between the optical path and the whiteboard 6 becomes large and an input is detected even at a position spaced apart from the whiteboard 6. To prevent this, it is necessary to lower the heights within the detectable range and make the sensor bars 1 as close to the whiteboard 6 as possible. However, this work may be skipped if detection at a position spaced apart from the whiteboard 6 does not matter.

By the above-described processing, the angle change and height adjustment of the sensor bars 1 are executed, and the use of the coordinate input apparatus starts (step S407).

The coordinate input apparatus is usable as long as a light amount distribution obtained by the light receiving unit 40 exceeds a preset detectable value as by changing the height in step S505. In other words, by setting a given height and angle, the coordinate input apparatus can cope with the whiteboard 6 which is convex or concave to a certain degree. Since this can be achieved by stepwise adjustment, the adjustment may be performed by the methods in the first and second embodiments. If it is only necessary to perform the angle change and height adjustment at one step, the angle changing units 107-L and 107-R having a given height and angle without including a given adjustment mechanism may be used.

A section of the whiteboard 6 in the X direction in FIG. 22C reveals that the whiteboard 6 is not curved in the Y direction. In the third embodiment, the sensor units 2, the whiteboard 6, and even the retroreflecting members 4 can be set almost parallelly in the Y direction. Thus, neither the angle change nor height adjustment in the Y direction need be taken into consideration.

It suffices to arrange the angle changing units 107 and height adjustment units 106 in the sensor bars 1 or on the outer side surfaces of the sensor bars 1, and adopt a mechanism which brings them into contact with the whiteboard 6 on the bottom surfaces of the sensor bars 1 only when the angle change and height adjustment are necessary. Alternatively, the angle changing units 107 and height adjustment units 106 may be configured to be detachable, and only when they are necessary, attached to the bottom surfaces of the sensor bars 1.

Figure 24A:
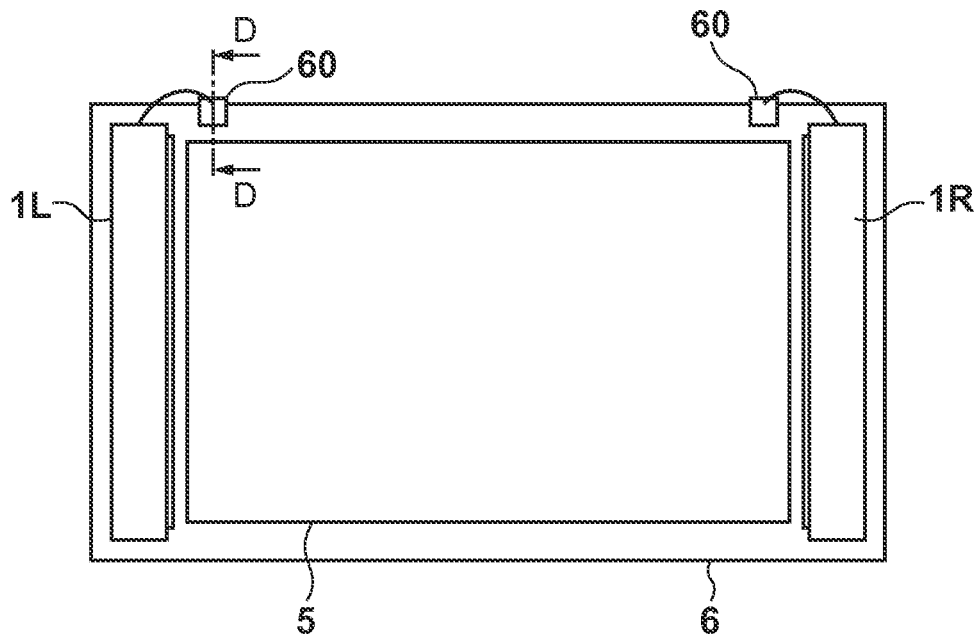
FIG. 24A is a view for explaining a safety hook according to the third embodiment.
Figure 24B:
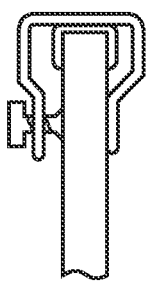
FIG. 24B is a view for explaining the safety hook according to the third embodiment.

The coordinate input apparatus according to the third embodiment includes a safety hook to prevent a drop from the whiteboard 6. In FIG. 24A, safety hooks 60 are arranged for both the left and right sensor bars 1. FIG. 24B is a sectional view showing in detail the section of the safety member.

The whiteboard 6 is surrounded by a frame in most cases, and the shape of the frame changes depending on the whiteboard 6. The safety hook 60 larger than the frame side width is used, and fixed by driving and fastening a screw member from the front. The safety hook 60 is connected to the sensor bar 1 by a string of an appropriate length. The safety hook 60 is fixed to the whiteboard 6 by its elasticity. Even if external force is applied and the sensor bar 1 is detached from the whiteboard 6, it does not drop to the floor.

The sensor bars 1 may be set and used on an electronic whiteboard or the like. On the rear surface of the electronic whiteboard, various mechanisms are arranged, and it is not practical to adopt the safety hook 60 which copes with all of them. Considering this, the left and right sensor bars 1 may be connected and coupled on the rear surface by safety members crossing each other in order to prevent a drop.

Although the third embodiment has described the use of the whiteboard 6 curved in the convex direction, a whiteboard 6 curved in the concave direction may be used. Even in this case, if the absolute values of curvatures in the convex and concave directions are equal, only the signs of the curvatures are opposite, so it is only necessary to reverse the direction of the angle changing unit 107 without any special member. For the concave curve, light emitted by the light projecting unit 30 is reflected by the surface of the whiteboard 6, and the angle changing unit 107 becomes less required, compared to the convex curve.

The third embodiment has described the whiteboard 6 having only one inflexion point at the center of the effective coordinate input region 5. This means that the whiteboard 6 is deformed in the first-order mode. There is a whiteboard 6 deformed in a higher-order mode. However, for an area-limited whiteboard 6, as the number of orders increases, the amplitude (the height difference of the whiteboard 6) decreases. Since the curvature of the whiteboard 6 also decreases, the coordinate input apparatus suffices to cope with a deformation in the first-order mode.

As described above, according to the third embodiment, in addition to the effects described in the first embodiment, the angle is changed in a direction perpendicular to the input surface. By fully using this arrangement, even if the input surface is distorted or convexed, the coordinate input apparatus can be set in a use state.

Fourth Embodiment

A coordinate input apparatus according to the fourth embodiment will be described with reference to FIGS. 25A to 25C. In the fourth embodiment, the coordinate input apparatus is attached to a whiteboard 6 which is curved at a constant curvature, like part of a spherical surface. Note that the position detection principle and the like are the same as those in the first embodiment, and a description thereof will not be repeated.

The long side direction of the whiteboard 6 is defined as the X direction, the short side direction of the whiteboard 6 is defined as the Y direction, and a direction perpendicular to the coordinate input surface is defined as the Z direction. FIG. 25A is a front view showing the coordinate input apparatus when the whiteboard 6 is viewed from the front. FIG. 25B is a sectional view taken along a line B-B in FIG. 25A, and FIG. 25C is a sectional view taken along a line C-C.

The angle changing unit 107 in the third embodiment can change only an angle in one direction. Therefore, the angle changing unit 107 can change only an angle in the X direction, or an angle in the Y direction by rotating the angle changing unit 107 by 90°.

However, the whiteboard 6 may be curved in both the X and Y directions, and if the angle is not satisfactorily changed, the sensor bar 1 may be deformed and set. When the angle changing unit 107 is set on the whiteboard 6 by a magnet, a gap may be generated between them and the adhesive force may decrease due to a small contact area. In this case, if a sudden external force is applied, the sensor bar 1 may drop and be broken, or may drop onto the user's foot and injure it.

The coordinate input apparatus according to the fourth embodiment includes two sensor bars 1. Two sensor units 2 are arranged at corners of an effective coordinate input region 5 for each sensor bar 1. Angle changing units 107 are not fixed in the Y-Z plane and have a structure free from angle adjustment. FIGS. 25B and 25C show the angle changing units 107. Each of the angle changing units 107 (107-L and 107-R in FIGS. 25B and 25C) is formed from a sensor bar-side angle changing member connected to the sensor bar 1 and a whiteboard-side angle changing member connected to the whiteboard 6. The sensor bar-side angle changing member and whiteboard-side angle changing member are formed from a freely slidable hinge and height adjustment unit capable of changing the angle while maintaining coupling. An angle in the Y-Z plane is restrained by only the hinge, and the angle changing unit 107 is set on the whiteboard 6 while maintaining the shape by using the rigidity of the sensor bar 1.

As for an angle in the X-Z plane, the angle between the sensor bar-side angle changing member and the whiteboard-side angle changing member is changeable by adjusting the height adjustment unit by using the hinge as the center. By the angle change, the sensor bar is set to face straight an opposite sensor bar. An angle in the Y-Z plane is changeable by the hinge, and is restricted by only the hinge. This arrangement can independently change angles in respective directions in the X-Z and Y-Z planes.

The angle changing units are arranged at the two ends of the sensor bar 1, and the sensor bar 1 does not deform as long as the angle changing units give a margin in the direction of height with respect to the convex amount of the whiteboard 6.

In the fourth embodiment, the angle can be changed using the hinge and height adjustment by raising the sensor bar 1 by a predetermined height without adjusting the height of the sensor bar 1. However, a mechanism capable of angle change and height adjustment at multiple steps may be arranged, similar to the first embodiment.

If it suffices to change the angle in the X-Z plane at one step as in the third embodiment, an assumed angle in the B-B section may be added to the angle changing unit 107, and the angle may be changed using the angle changing unit 107. In this case, the hinge freely slides only at an angle in the Y-Z plane.

Figure 26:
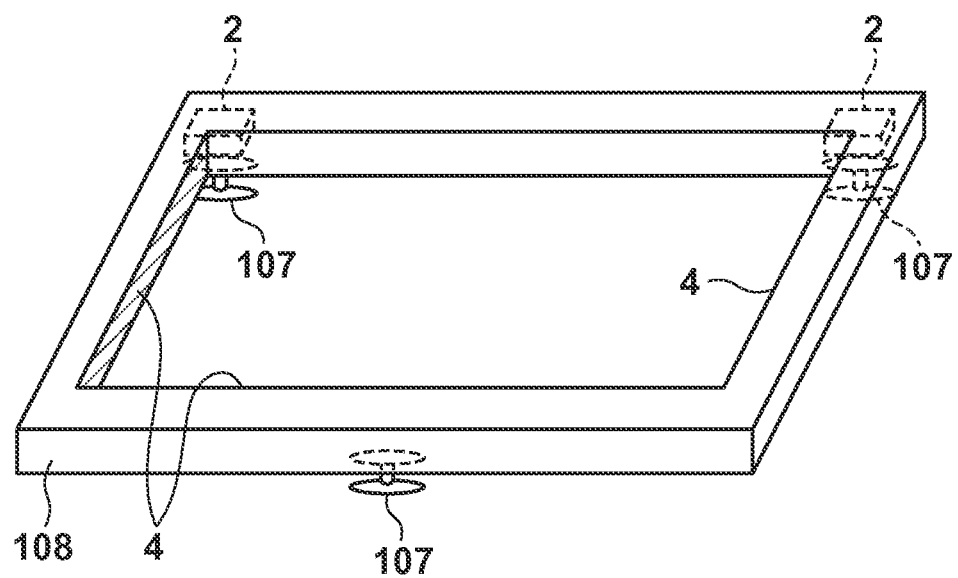
FIG. 26 is a view showing an application of an angle change/height adjustment unit according to the fourth embodiment to the coordinate input apparatus according to the second embodiment.

When two sensors and retroreflecting members 4 are arranged on a base 108 as in the second embodiment, as shown in FIG. 26, it is only necessary that the angle changing unit 107 has an angle changing function capable of 360° rotation in all directions. In this case, angles in both the X-Z and Y-Z planes can be maintained in the plane by using the rigidity of the base 108. The angle changing unit 107 can correct an inclination with respect to the whiteboard 6 (the whiteboard 6 is not shown).

As described above, according to the fourth embodiment, in addition to the effects described in the third embodiment, the angle is freely changed with respect to the input surface. By fully using this arrangement, even if the input surface is distorted or convexed, the coordinate input apparatus can be set in a use state.

Fifth Embodiment

All the height adjustment units 106 in the first and second embodiments may be electrically operated to the same height simultaneously by using electronic components such as solenoids.

<<Characteristic Arrangements and Effects of Present Invention>>

As described above, according to the present invention, a coordinate input apparatus which calculates the coordinates of a pointed position to an almost rectangular effective coordinate input region includes first and second housings (sensor bars) each of which incorporates at least two sensor units. Each housing includes a retroreflecting member for returning incident light to the incoming direction. The first and second housings are arranged on two facing sides of the almost rectangular effective coordinate input region.

The sensor unit arranged in each housing includes a light projecting unit which projects infrared light toward the retroreflecting member of the housing arranged on a facing side, and a light receiving unit which receives light retroreflected by the retroreflecting member. A touch in the effective coordinate input region cuts off the optical path, and at least two sensor units can detect directions, corresponding to the touch position, in which light is cut off. The touch position can be calculated by geometrical calculation based on angle information detected by at least two sensor units and distance information between these two sensor units.

The first and second housings include attaching/detaching units (height adjustment units) capable of attachment and detachment to and from a screen surface serving as a coordinate input surface so that the first and second housings can be carried.

Considering the carriage, the first and second housings are desirably configured to be more compact and lighter weight. The light receiving optical system of the sensor unit according to the present invention has a predetermined field range (about 50°). Although the optical axis of the light receiving optical system is set in the normal direction of the pixel of a photoelectric converter, the field range is set to be asymmetric, and the sensor unit includes the optical system asymmetric to the optical axis. The optical axis (or the normal direction of the pixel of the photoelectric converter) is set to be perpendicular to a straight line connecting at least two sensor units (the centers of the optical axes of the light receiving optical systems) stored in the housing. This arrangement can further downsize the housing storing the sensor units.

Screen surfaces are assumed to have various sizes or aspect ratios, and the effective coordinate input region is set in accordance with the size and shape of the screen surface. For this purpose, each of the first and second housings includes a stretching/contraction unit. By adjusting the stretching/contraction amount, the distance between the sensor units arranged in the housing changes, and the sensor units can be appropriately arranged in accordance with the size of the screen surface.

When attaching the first and second housings including the sensor units, even if their relative positions are not precisely determined, a touch position can be detected at high accuracy. Detection units which detect relative positional information between the sensor units stored in the respective housings upon attaching the housings are arranged, and allow the user to easily attach the housings without being conscious of the relative positions.

If no dedicated driver software need be installed in a personal computer or the like which receives information output from the coordinate input apparatus, the user can use the coordinate input apparatus immediately upon connecting it to an arbitrary personal computer or the like. Work (calibration) to make the coordinate system (digitizer coordinate system) of the coordinate input apparatus and the coordinate system (screen coordinate system) of the display apparatus coincide with each other can be executed without the mediacy of the personal computer.

The main part of the present invention in the coordinate input apparatus is as follows.

A coordinate input apparatus which detects a pointed position to an effective coordinate input region, comprising:

a light projecting unit configured to project light parallelly to the effective coordinate input region;

a reflection unit configured to retroreflect the light projected by said light projecting unit;

a light receiving unit configured to receive light from one of said light projecting unit and said reflection unit; and a moving unit configured to move a set of said light projecting unit, said light receiving unit, and said reflection unit in a direction perpendicular to the effective coordinate input region in order to ensure a light amount with which the pointed position in the effective coordinate input region can be calculated based on a variation of a light amount distribution obtained from said light receiving unit.

As described above, according to the present invention, all the building components necessary to detect a touch position are stored in the two housings. The housings are attached to a flat whiteboard, wall surface, or the like, and can detect a touch position. That is, the coordinate input apparatus according to the present invention does not include, as an indispensable building component, a touch input surface serving as the effective coordinate input region. Therefore, even if the effective coordinate input region becomes large (for example, 90-inch class), the operational environment can be implemented everywhere by carrying only the two housings. Further, since the coordinate input apparatus according to the present invention does not include the touch input surface as a building component, the product cost can be greatly reduced, as a matter of course. In other words, the present invention has a significant effect of reducing the introduction cost by using an existing whiteboard or the like held by the user.

Storing all the building components in the two housings gives an effect of easy attachment, wiring, and the like to the whiteboard by the user. Considering carriage, the housings are made more compact and lighter, and the light receiving optical system of the sensor unit is set to be asymmetric to the optical axis. Accordingly, more compact and lighter housings can be implemented, improving portability.

For example, considering attachment to an existing whiteboard, the size of the whiteboard varies depending on the manufacturer, product model number, and the like. If the coordinate input apparatus can be used by utilizing a whiteboard which has already been purchased and used by the user, this leads to reduction of the introduction cost or effective use of the resources.

In the coordinate input apparatus capable of high-accuracy position detection, the housings can be attached at rough accuracy, greatly reducing cumbersome installation and shortening the installation time.

For example, assume that an environment is built, where the coordinate input apparatus formed from the two housings is carried into a meeting room where a whiteboard, personal computer, and front projector have already been introduced, and the screen is directly touched and operated.

At this time, the personal computer already introduced in the meeting room is quickly set usable without installing a driver or the like for operating the coordinate input apparatus, thereby improving installation easiness and portability. That is, a dedicated personal computer in which the driver or the like has already been installed need not be carried together with the coordinate input apparatus. Since installation work to the personal computer in the meeting room is unnecessary, a meeting can quickly start without any unwanted setup time.

The present invention adopts an arrangement in which a set of the light projecting unit, light receiving unit, and retroreflecting member is moved in a direction perpendicular to the input surface or the angle is changed. By fully using this arrangement, even if the input surface is distorted or convexed, the apparatus can be set in a use state.

Since this arrangement can always keep projected light and received light parallel to the input surface, the depth of response to a touch can be made uniform in the entire input surface, providing a comfortable operational environment.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-052215, filed on Mar. 8, 2012 and 2012-192297, filed on Aug. 31, 2012, which are hereby incorporated by reference herein in their entirety.

What is claimed is:

1. A coordinate input apparatus which detects a pointed position to an effective coordinate input region, comprising:
   a light projecting unit constructed to project light to the effective coordinate input region;
   a reflection unit constructed to retroreflect the light projected by said light projecting unit;
   a light receiving unit constructed to receive light from one of said light projecting unit and said reflection unit;
   a moving unit constructed to move a set of said light projecting unit, said light receiving unit, and said reflection unit in order to change a light amount received by said light receiving unit;
   a determination unit constructed to determine whether the light amount received by said light receiving unit is appropriate for calculating the pointed position in the effective coordinate input region; and
   a notification unit constructed to notify a determination result of said determination unit.

2. The apparatus according to claim 1, further comprising an angle changing unit constructed to be able to change an angle with the effective coordinate input region for the set of said light projecting unit, said light receiving unit, and said reflection unit.

3. The apparatus according to claim 1, further comprising a setting unit constructed to set said moving unit to a predetermined height.

4. The apparatus according to claim 1, further comprising a display unit constructed to display a moving amount of said moving unit.

5. The apparatus according to claim 1, further comprising:
   a first housing constructed to incorporate at least two sensor units each including the light projecting unit and the light receiving unit; and
   a second housing constructed to incorporate at least two sensor units each including the light projecting unit and the light receiving unit,
   wherein said first housing and said second housing are arranged on two facing sides of a rectangular region forming the effective coordinate input region, and
   each of said first housing and said second housing includes said reflection unit to retroreflect light projected by said light projecting unit of the sensor unit of the other housing.

6. The apparatus according to claim 5, wherein in each of said first housing and said second housing,
   a light receiving optical system forming said light receiving unit is set to be symmetric to an optical axis serving as a normal direction of a pixel of a photoelectric converter forming the light receiving optical system, and is set to be perpendicular to a straight line containing a center of the optical axis of said light receiving unit incorporated in each of the at least two sensor units in a single housing, and
   a field range of the light receiving optical system is set to be asymmetric to the optical axis.

7. The apparatus according to claim 5, wherein each of said first housing and said second housing includes a stretching/contraction unit constructed to increase/decrease a distance between the at least two sensor units incorporated in each of said first housing and said second housing.

8. The apparatus according to claim 5, further comprising a detection unit constructed to detect relative positional information between the sensor units incorporated in each of said first housing and said second housing.

9. The apparatus according to claim 5, further comprising a calibration unit constructed to execute calibration to correlate a first coordinate system in the effective coordinate input region of the coordinate input apparatus and a second coordinate system in a display region serving as a projected image from a display apparatus that is set in the effective coordinate input region.

10. The apparatus according to claim 1, further comprising a base constructed to arrange, on one side of a rectangular region forming the effective coordinate input region, a housing incorporating at least two sensor units each including the light projecting unit and the light receiving unit, and said reflection unit and at least three moving units on remaining three sides.

11. The apparatus according to claim 1, wherein
   said moving unit includes a plurality of moving units, and
   said plurality of moving units are formed from electronic components which can be electrically operated and set to the same height simultaneously.

12. The apparatus according to claim 1, wherein said notification unit visibly notifies the determination result of said determination unit.

13. The apparatus according to claim 1, wherein said light projecting unit projects light in a direction parallel to the effective coordinate input region, and said moving unit moves the set of said light projecting unit, said light receiving unit, and said reflection unit.

14. An apparatus which detects a pointed position to an effective coordinate input region, comprising:
   a first housing constructed to incorporate at least two first sensor units each comprising a first light receiving unit and a first light projecting unit constructed to project light to the effective coordinate input region;
   a second housing constructed to incorporate at least two second sensor units each comprising a second light receiving unit and a second light projecting unit constructed to project light to the effective coordinate input region;
   at least two first moving units constructed to move said at least two first sensor units in order to change a light amount received by said first light receiving unit of each of said at least two first sensor units;
   at least two second moving units constructed to move said at least two second sensor units in order to change a light amount received by said second light receiving unit of each of said at least two second sensor units;
   a determination unit constructed to determine whether the light amounts received by said first and second light receiving units are appropriate for calculating the pointed position in the effective coordinate input region; and
   a notification unit constructed to notify a determination result of said determination unit,
   wherein said first housing and said second housing are arranged on two facing sides of a rectangular region forming the effective coordinate input region, said first housing comprises a first reflection unit constructed to retroreflect light projected by said second light projecting unit of the second sensor units, said second housing comprises a second reflection unit constructed to retroreflect light projected by said first light projecting units of the first sensor unit, said first light receiving unit receives light from one of said second light projecting unit and said second reflection unit, and said second light receiving unit receives light from one of said first light projecting unit and said first reflection unit.

15. The apparatus according to claim 14, further comprising:

at least two first angle changing units constructed to be able to change angles with the effective coordinate input region for at least two first sensor units, and at least two second angle changing units constructed to be able to change angles with the effective coordinate input region for at least two second sensor units.

16. The apparatus according to claim 14, wherein said notification unit visibly notifies the determination result of said determination unit.

17. An assembly used with another assembly in an apparatus which detects a pointed position to an effective coordinate input region, wherein said assembly and said another assembly are arranged on two facing sides of a rectangular region forming the effective coordinate input region, the assembly comprising:

at least two sensor units each comprising a light receiving unit and a light projecting unit constructed to project light to the effective coordinate input region;

a reflection unit constructed to retroreflect light projected by at least two other sensor units of said another assembly;

at least two moving units constructed to move said at least two sensor units in order to change a light amount received by said light receiving unit of each of said at least two sensor units;

a determination unit constructed to determine whether the light amount received by said light receiving unit is appropriate for calculating the pointed position in the effective coordinate input region; and a notification unit constructed to notify a determination result of said determination unit, and wherein said light receiving unit receives light projected by said at least two other sensor units of said another assembly and light retroreflected by another reflection unit of said another assembly.

18. The assembly according to claim 17, further comprising:

at least two angle changing units constructed to be able to change angles with the effective coordinate input region for at least two sensor units.

19. The assembly according to claim 17, wherein said notification unit visibly notifies the determination result of said determination unit.

* * * * *